US009698722B2

(12) United States Patent
Loken et al.

(10) Patent No.: US 9,698,722 B2
(45) Date of Patent: Jul. 4, 2017

(54) METHOD AND INVERTER WITH THERMAL MANAGEMENT FOR CONTROLLING AN ELECTRIC MACHINE

(71) Applicant: Deere & Company, Moline, IL (US)

(72) Inventors: David M. Loken, West Fargo, ND (US); Long Wu, Fargo, ND (US); Tianjun Fu, Fargo, ND (US); Robert B. Shaw, Moorhead, MN (US); Neal D. Clements, Sheldon, ND (US)

(73) Assignee: DEERE & COMPANY, Moline, IL (US)

( * ) Notice: Subject to any disclaimer, the term of this patent is extended or adjusted under 35 U.S.C. 154(b) by 127 days.

(21) Appl. No.: 14/837,496

(22) Filed: Aug. 27, 2015

(65) Prior Publication Data
US 2016/0373047 A1 Dec. 22, 2016

Related U.S. Application Data

(60) Provisional application No. 62/182,108, filed on Jun. 19, 2015.

(51) Int. Cl.
*H02P 1/04* (2006.01)
*H02P 29/00* (2016.01)
*H02P 29/68* (2016.01)
*H02M 7/5387* (2007.01)

(52) U.S. Cl.
CPC .... *H02P 29/0088* (2013.01); *H02M 7/53875* (2013.01); *H02P 29/68* (2016.02)

(58) Field of Classification Search
CPC ... H02M 7/537; H02M 7/53871; H02P 29/68; H02P 27/08; H02P 29/60; H02P 29/64; H02P 29/0088

USPC ................ 318/471, 472, 722, 801, 811, 432
See application file for complete search history.

(56) References Cited

U.S. PATENT DOCUMENTS

| 5,721,479 | A | * | 2/1998 | Kumar | ................. B60L 15/025 |
|---|---|---|---|---|---|
| | | | | | 318/801 |
| 6,114,828 | A | * | 9/2000 | Matsunaga | ........... B60L 3/0023 |
| | | | | | 180/65.8 |
| 7,019,480 | B2 | * | 3/2006 | Suzuki | .................... H02P 29/02 |
| | | | | | 318/400.08 |

(Continued)

FOREIGN PATENT DOCUMENTS

GB 2510658 A 8/2014

OTHER PUBLICATIONS

British Search Report in foreign counterpart application No. GB1610696.5, dated Dec. 14, 2016 (3 pages).

*Primary Examiner* — Bentsu Ro
*Assistant Examiner* — Thai Dinh

(57) ABSTRACT

A temperature estimation module estimates each junction temperature of a corresponding semiconductor device, among a plurality of semiconductor devices, for each phase of an inverter. The temperature estimation module or the data processing system determines a hottest device with a highest junction temperature among the semiconductor devices. A thermal adjustment module or data processing system determines if the highest junction temperature parameter is less than maximum junction temperature parameter for the respective semiconductor device or deciding whether or not to adjust a duty cycle of the semiconductor devices.

20 Claims, 16 Drawing Sheets

(56) References Cited

U.S. PATENT DOCUMENTS

| | | | |
|---|---|---|---|
| 7,071,649 B2 * | 7/2006 | Shafer | B62D 5/0496 |
| | | | 318/708 |
| 7,199,549 B2 * | 4/2007 | Kleinau | B60L 11/14 |
| | | | 318/787 |
| 8,120,306 B2 | 2/2012 | Chakrabarti et al. | |
| 2009/0051307 A1 | 2/2009 | Katsuyama et al. | |
| 2009/0058350 A1 | 3/2009 | Wei et al. | |
| 2010/0018535 A1 | 1/2010 | Chimenti et al. | |

* cited by examiner

METHOD AND INVERTER WITH THERMAL MANAGEMENT FOR CONTROLLING AN ELECTRIC MACHINE

RELATED APPLICATION

This document (including the drawings) claims priority and the benefit of the filing date based on U.S. provisional application No. 62/182,108, filed Jun. 19, 2015 under 35 U.S.C. §119 (e), where the provisional application is hereby incorporated by reference herein.

FIELD OF THE INVENTION

This invention relates to a method and inverter with thermal management for controlling an electric machine.

BACKGROUND OF THE INVENTION

An electric motor may feature a rotor with permanent magnets and a stator, such as an interior permanent magnet (IPM) motor or an IPM synchronous motor. An inverter may control the electric motor or other electric machine, such as an alternating current, variable frequency motor. In certain prior art, the maximum current that can be provided by the inverter to the electric motor is limited by the junction temperatures of the switching devices of the inverter. At stall and low fundamental frequency operation, the current output capability of an inverter is limited to lower output capability than can be achieved at higher fundamental frequency operation. Thus, there is a need for an improved method and inverter with thermal management for controlling an electric machine.

SUMMARY OF THE INVENTION

In accordance with one embodiment, a method or inverter with thermal management is presented for control of an electric machine. An electronic data processing system determines a fundamental frequency of one or more inverter phases based on a torque command to control the torque, speed or direction of the electric machine (e.g., motor). The electronic data processing system establishes an initial reference output current based on the torque command or other input data. A temperature estimation module estimates each junction temperature of a corresponding semiconductor device, among a plurality of semiconductor devices, for each phase of an inverter. The temperature estimation module or the data processing system determines a hottest device with a highest junction temperature among the semiconductor devices. A thermal adjustment module or data processing system determines if the highest junction temperature parameter (e.g., an absolute junction temperature, or rise or difference in the junction temperature) is less than maximum junction temperature parameter (e.g., an absolute maximum junction temperature, or maximum rise or maximum difference in in junction temperature) for the respective semiconductor device or deciding whether or not to adjust a duty cycle of the semiconductor devices.

DESCRIPTION OF THE PREFERRED EMBODIMENT

Figure 1A:
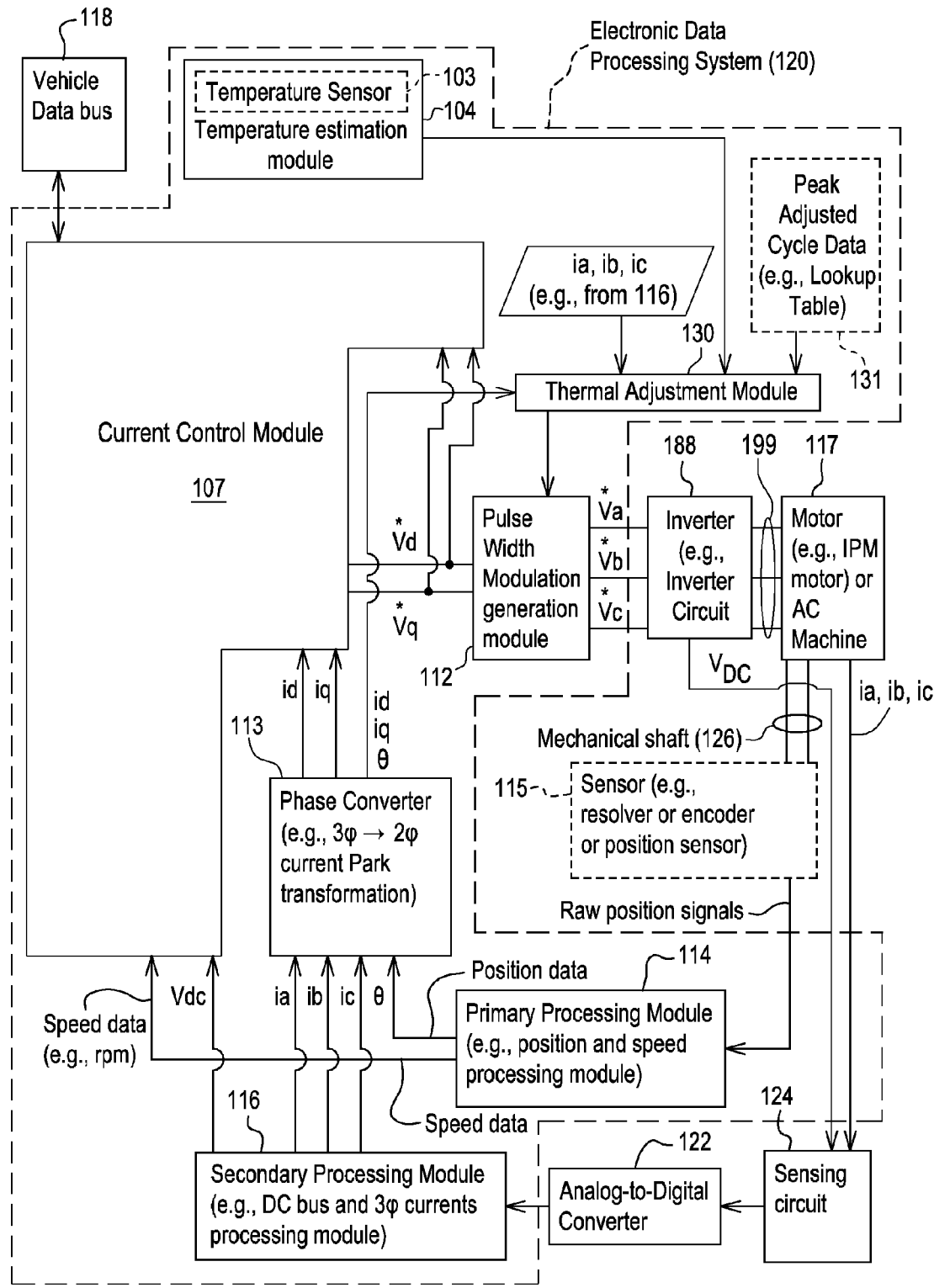
FIG. 1A is a block diagram of one embodiment of a method and inverter with thermal management for controlling an electric machine.

In accordance with one embodiment, FIG. 1A discloses method and inverter for controlling a motor 117 (e.g., an interior permanent magnet (IPM) motor), or another electric machine (e.g., alternating current machine) with thermal management. In one embodiment, the system, aside from the motor 117, may be referred to as an inverter or a motor controller. The thermal management is well suited for allocation of heat and power handling between or among the different semiconductor devices of the inverter.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1A and is shown in greater detail in FIG. 2.

The data processing system 120 is coupled to an inverter 188. In one embodiment, the inverter 188 comprises a semiconductor drive circuit that drives or controls semiconductor devices (e.g., insulated gate bipolar transistors (IGBT) or other power switching transistors) to output control signals for the motor 117. In turn, the inverter 188 is coupled to the motor 117. In one embodiment, the motor 117 is associated with an optional sensor 115 (e.g., a position sensor, a resolver or encoder position sensor) that is associated with the motor shaft 126 or the rotor. The optional sensor 115 and the motor 117 are coupled to the data processing system 120 to provide feedback data (e.g., current feedback data, such as $i_a$, $i_b$, $i_c$), raw position signals, among other possible feedback data or signals, for example.

In an alternate embodiment, the optional sensor 115 may be deleted or replaced by a sensorless position design that uses current and/or voltage feedback at phase output terminals via sensing circuit 124. The optional sensor 115 is indicated as optional by the dashed lines in FIG. 1A. Other possible feedback data includes, but is not limited to, winding temperature readings, semiconductor temperature readings of the inverter 188, three phase voltage data, or other thermal or performance information for the motor 117.

In one embodiment, the current control module 107 is coupled to the vehicle data bus 118. The current control module 107 receives torque commands (e.g., via the vehicle data bus 118) and converters the torque commands to Id and Iq commands (e.g., current commands). For example, the Id and Iq commands are associated with output voltages Vd* and Vq*, respectively, that are provided to the pulse width modulation generation module 112 to control the motor or alternating current machine 117. D-q axis current refers to the direct axis current and the quadrature axis current as applicable in the context of vector-controlled alternating current machines, such as the motor 117. In turn, one or more outputs (e.g., direct axis current data ($i_d$*) and quadrature axis current data ($i_q$*)) are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d$* and $i_q$*) and actual d-q axis currents (e.g., $i_d$ and $i_q$) and outputs corresponding d-q axis voltage commands (e.g., $v_d$* and $v_q$* commands) for input to the PWM generation module 112.

In one embodiment, the PWM generation module 112 converts the direct axis voltage and quadrature axis voltage data from two phase data representations into three phase representations (e.g., three phase voltage representations, such as $v_a$*, $v_b$* and $v_c$*) for control of the motor 117, for example. Outputs of the PWM generation module 112 are coupled to the inverter 188.

The inverter 188 comprises power electronics, such as switching semiconductors to generate, modify and control pulse-width modulated signals or other alternating current signals (e.g., pulse, square wave, sinusoidal, or other waveforms) applied to the motor 117. The PWM generation module 112 provides inputs to a driver stage within the inverter 188. An output stage of the inverter 188 provides a modulated signal, a pulse-width modulated signal, a pulse-width modulated voltage waveform, a space-vector, pulse-width modulated (SVPWM) signal a voltage signal, or other signal for control of the motor. In one embodiment, the inverter 188 is powered by a direct current (DC) voltage bus.

The motor 117 is associated with an optional sensor 115 (e.g., a resolver, encoder, speed sensor, or a position sensor or sensors) that measures at least one of an angular position of the motor shaft 126, a speed or velocity of the motor shaft 126, and a direction of rotation of the motor shaft 126. The optional sensor 115 may be mounted on or integral with the motor shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the optional sensor 115 (e.g., digital position encoder) may provide a digital data output of position data or velocity data for the motor shaft 126 or rotor.

A first output (e.g., position data and speed data for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the current control module 107.

An input of a sensing circuit 124 is coupled to terminals of the motor 117 or output phase terminals of 188 for sensing at least the measured three-phase currents. An input of sensing circuit 124 is also coupled to the DC link terminals of the inverter 188 for sensing the voltage level of the direct current (DC) bus (e.g., high voltage DC bus which may provide DC power to the inverter 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current control module 107. Further, the secondary processing module may provide input data or direct voltage level of the direct current bus of the inverter 188 to the current control module 107.

In one embodiment, the temperature estimation module 104 estimates the temperature parameter of one or more semiconductor switches, diodes or both in the inverter 188. The temperature parameter can refer to an absolute temperature or a change in temperature from ambient temperature, an off-temperature of the inverter, or a reference temperature. For example, the temperature estimation module may estimate the temperature parameter of the switches, diodes, or both, based on thermal impedance ($\Theta$) of the semiconductor device (e.g., switch or diode) at steady state operation and/or with a dynamic input (e.g., actual or modeled currents) at low fundamental frequencies including stall conditions, and with power dissipation (P) (e.g., conduction loss and switching losses over one cycle of phase current) of the semiconductor device, where estimated temperature parameter of the device is equal to or proportional to thermal impedance multiplied by power dissipation. The temperature estimation module 104 may use a dynamic model of the thermal impedance ($\Theta$) that includes the thermal time constants and resistances of the particular semiconductor devices in the inverter 188, for example.

The temperature estimation module 104 may be associated with a temperature sensor 103 that senses the temperature parameter (e.g., absolute temperature or a change in temperature) of a coolant that is circulated to cool the inverter 188, or a temperature sensor 103 that is mounted in, around, or about one or more semiconductor devices of the inverter 188. For example, the temperature sensor 103 may comprise a thermistor, infrared thermal sensor, or another thermal sensor.

In one embodiment, the temperature estimation module 104 and the peak adjusted cycle data 131 (e.g., look-up table) are coupled to the thermal adjustment module 130. The thermal adjustment module 130 can use input data from one or more of the following: temperature estimation module 104, temperature sensor, peak adjusted cycle data 131, and phase converter 113. The output data of the thermal adjustment module 130 can be communicated to the pulse width modulation generation module 112, the inverter 188, or both. Based on the foregoing input data, the thermal adjustment module 130 can adjust (e.g., indirectly via the carrier waveform outputted by the pulse width generation module 112) one or more of the following: (1) the duty cycle, such as a common mode duty cycle, which is also known as the DC (direct current) offset or zero states of multiple phase outputs 199, (2) the duty cycle of one or more phase outputs 199 of the inverter 188 to manage the allocation of heat dissipation between one or more high-side semiconductor devices (e.g., high-side switches and high-side diodes) and one or more low-side semiconductor devices (e.g., low-side switches and low-side semiconductors) of the inverter 188, (3) duty cycle of one or more phase outputs of the inverter 188 to manage the allocation heat dissipation between one or more diodes and one or more semiconductor switches of the inverter in one or more phases of the inverter 188, (4) the peak amplitude or injection percentage (i.e., duty cycle values can vary from 0 to 1, whereas injection percentage expresses the duty cycle as a percentage) of the common mode duty cycle waveform or adjusted duty cycle waveform to allocate heat dissipation between high-side and low-side semiconductor devices of one or more phases, and (5) the phase offset (e.g., approximately (plus or minus ten percent) zero degrees to approximately 360 degrees shift in the injected offset function) of a common mode offset waveform or adjusted duty cycle waveform with respect to the output phases to allocate heat dissipation between semiconductor switches and semiconductor diodes of one or more phase outputs 199 of the inverter 188. The semiconductor devices of the inverter 188 are described in greater detail in conjunction with FIG. 1B.

In one embodiment, the method or system may operate in the following manner. The current control module 107 receives an input control data message, such as a speed control data message, a voltage control data message, or a torque control data message, over a vehicle data bus 118.

The current control module 107 selects or determines the direct axis current command data and the quadrature axis current command data associated with respective torque control command data and respective detected motor shaft 126 speed data. The optional sensor 115 on the motor 117 facilitates provision of the detected speed data for the motor shaft 126, where the primary processing module 114 may convert position data provided by the sensor 115 into speed data. In one embodiment, the motor 117 may comprise an interior permanent magnet (IPM) machine or an IPM synchronous machine (IPMSM). An IPMSM has many favorable advantages compared with conventional induction machines or surface mounted permanent magnet (SMPM) machines such as high efficiency, high power density, wide constant power operating region, and maintenance free, for instance. In one embodiment, the motor 117 may comprise an alternating current, three phase, variable frequency drive motor.

The optional sensor 115 (e.g., shaft or rotor speed detector) typically is comprised of, but not limited to, one or more of the following: an optical encoder, a magnetic field sensor (e.g., Hall Effect sensor), magneto-resistive sensor, or a resolver (e.g., a brushless resolver). In one configuration, the sensor 115 comprises a position sensor, where position data and associated time data are processed to determine speed or velocity data for the motor shaft 126. In another configuration, the optional sensor 115 comprises a speed sensor, or the combination of a speed sensor and an integrator to determine the position of the motor shaft. The optional sensor 115 may also be removed and sensor-less position detection methods maybe used to obtain position and velocity information.

For certain motor control schemes (e.g., direct torque control or vector control), the fundamental frequency or carrier frequency of an inverter is determined based on a torque command inputted by a user or controller to control the torque, speed or direction of the rotor of an electric motor or electric machine in a motoring mode or a braking mode or a power generation mode. In some embodiments, the fundamental frequency is lower than the PWM carrier frequency to facilitate the provision of a precise sinusoidal waveform at the fundamental frequency. If the fundamental frequency of the inverter is less or equal than a (fundamental) threshold frequency (e.g., less than approximately 2 Hz or another suitable threshold frequency that depends on the thermal time constants of the inverter), or if the rotor speed is at or below a certain threshold, a thermal adjustment module 130 or data processor of the data processing system 120 allows thermal adjustment (e.g., duty cycle adjustment, phase offset of common mode offset waveform, or both). In an inverter 188 or motor controller, the duty cycle adjustment allows the stall torque or low speed torque of motor to be maximized or used to full capacity. Stall torque is defined as the motor torque that is produced when the rotational speed of the rotor is zero. If the fundamental frequency is greater than a threshold frequency, then the thermal adjustment module 130 or data processor determines duty cycle ratios based on a SVPWM algorithm or another modulation scheme (e.g., where d-q axis voltage commands (e.g., $v_d^*$ and $v_q^*$ commands) are produced or used).

Figure 1B:
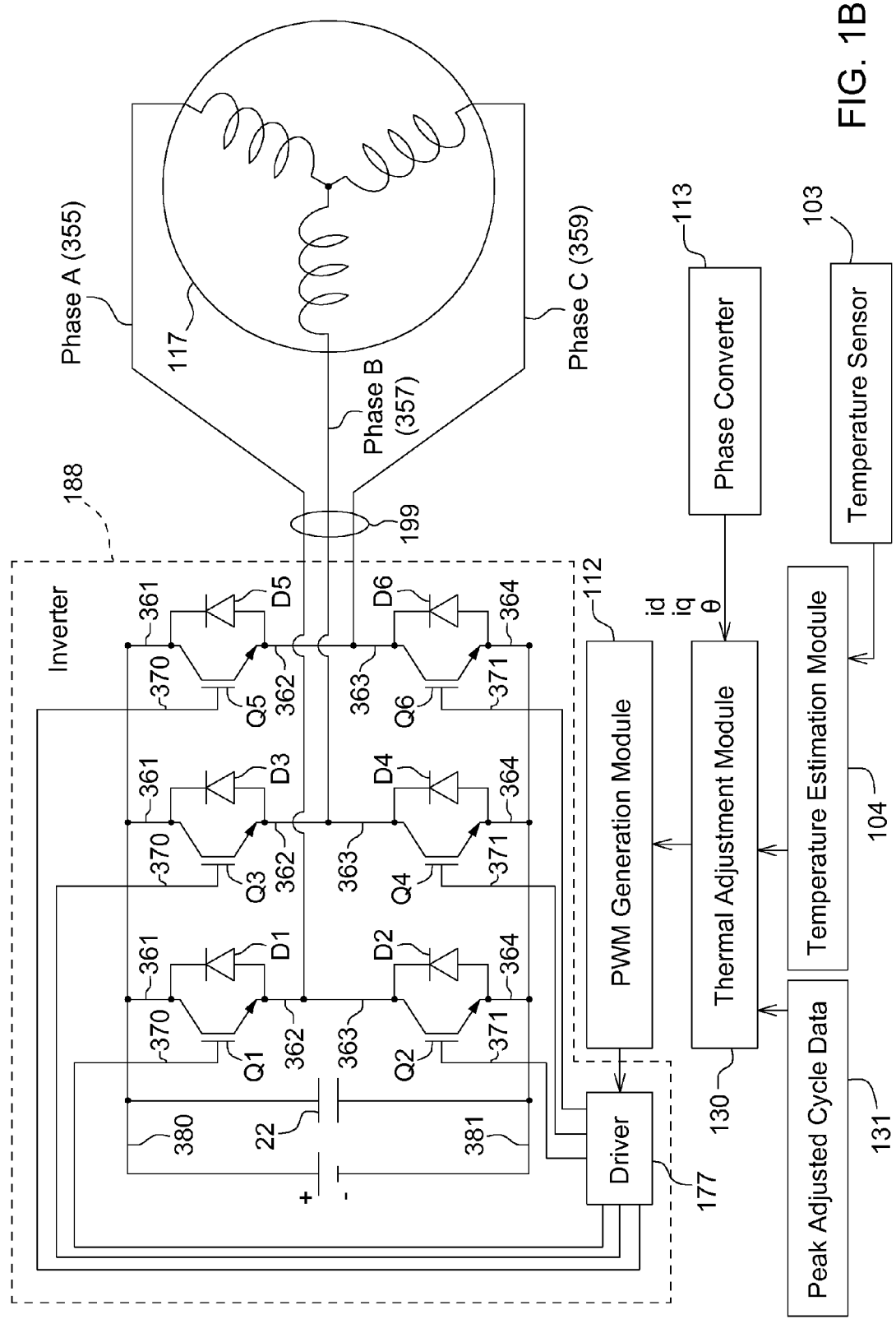
FIG. 1B is a block diagram that shows the inverter switching circuit of FIG. 1A in greater detail than FIG. 1A does.

In FIG. 1B, in one example, an inverter 188 or inverter has three output phases: Phase A (355), Phase B (357) and Phase C (359). As used throughout this document, semiconductor devices comprise semiconductor switches (Q1, Q2, Q3, Q4, Q5 and Q6), diodes (D1, D2, D3, D4, D5 and D6), or both. Each output phase has a high-side switch (Q1, Q3, Q5) and a low-side switch (Q2, Q4, Q6). Each high-side switch may have switched terminals (361, 362) and a control terminal 370. Similarly, each low-side switch may have switched terminals (363, 364) and a control terminal 371. A first switched terminal 361 of each high-side switch is coupled to a positive direct current supply 380 or bus. A first switched terminal 364 of each low-side switch is coupled to a negative direct current supply 381 or bus. As illustrated, a second switched terminal 362 of the high-side switch is coupled to a second switched terminal 363 of the low-side switch to provide an output signal, such as pulse width modulated output signal for a single phase. Each high-side diode (D1, D3, D5) may be placed in parallel with the switched terminals (361, 362) of a corresponding high-side switch (Q1, Q3, Q5) and each low-side diode (D2, D4, D6) may be placed in parallel with the switched terminals (363, 364) of the corresponding low-side switch (Q2, Q4, Q6).

For each semiconductor switch, the switched terminals (361, 362, 363, 364) may refer to the emitter and collector if the semiconductor switch comprises a transistor, or the switching terminals may refer to the source and drain if the semiconductor device comprises a field effect transistor. A control terminal (e.g., base or gate) of the semiconductor device is coupled to a control circuit or a driver 177.

The driver 177 may comprise a circuit, a controller, microcontroller, a programmable logic array, a microprocessor, or another data processor that is adapted to provide driving signals to the control terminals (370, 371). For example, the driver 177 provides a set of control signals to the control terminals (370, 371) of the low-side switch (Q2, Q4, Q6) and the high-side switch (Q1, Q3, Q5) for each phase in a synchronized or coordinated manner. The thermal adjustment module 130 may alter or adjust the duration and phase (or polarity) of the control signals applied to the driver 177 to control the control terminals of the switches (Q1-Q6) to adjust heat distribution among the semiconductor devices (Q1 through Q6, inclusive, and D1 through D6, inclusive). The durations of certain control signals or the ratio of the durations of certain control signals applied by the driver 177 to certain ones of the control terminals (370, 371) of the switches for one or more phases determines the duty cycle or duty ratio for the semiconductor devices in one or more phases.

For example, if the fundamental frequency is low or below a threshold frequency, the control signals can incorporate or be derived from (a common mode offset function waveform or) an adjusted duty cycle (e.g., 508, 514, 575, 576, 528, 530) such as that shown in FIG. 10, FIG. 11C, FIG. 12B or FIG. 13B. In one embodiment, the thermal adjustment module 130 or the PWM generation module 112 symmetrically alters the duty cycle across all phases at conditions other than stall. For a three phase system not operating at stall condition, the frequency of the common mode offset waveform injected to provide the common mode duty cycle alteration is typically a multiple of three times the fundamental frequency. In one embodiment, the optimal DC offset function waveform is a function of the semiconductor device parameters or properties, which can be obtained from a characterization process, testing, or manufacturer specifications.

As used throughout the document, duty cycle or duty ratio may refer to a common mode duty ratio, a first phase (e.g., Phase A) duty ratio, a second phase (e.g., Phase B) duty ratio, or a third phase (e.g., Phase C) duty ratio. Although the duty cycle or duty ratio may be defined with reference to a particular sector of space-vector, pulse-width modulation (SVPWM) for illustrative purposes, it is understood that the duty cycle or duty ratio may be applied to any sector of SVPWM or other PWM control schemes.

For a pulse-width modulated signal for a single phase of the inverter, the duty cycle for any switch can be determined in accordance with the following equation: $D=T_{on}/(T_{on}+T_{off})$, where $T_{on}$ is the on duration or on time of pulse width of a PWM signal for a period or cycle and $T_{off}$ is the off duration or off time of the cycle or period. $T_{on}+T_{off}$ is equal to one cycle or period of the PWM signal. The duty cycle can have a range from 0 to 1. To get full differential alternating current (AC) output voltage capability at the output terminal of an inverter, a baseline duty cycle or 0.5 duty cycle is required. The duty cycle for low-side diode and low-side switch is 1-D, where D is the duty cycle for the high side switch and diode. In the typical IGBT-based (insulated gate bipolar transistor-based) inverter (e.g., inverter 188), the semiconductor device that is conducting is dependent on the current flow; the switch device (Q1-Q6, inclusive) is not capable of reverse conduction such that the antiparallel diode (D1-D6, respectively) coupled to the non-conducting switch device would conduct during the on such portion of the cycle (e.g., of the driving waveform for the switch device. Shifting D can shift the conduction losses (or thermal dissipation) between the high-side and low-side semiconductor devices in a phase and can impact the maximum differential voltage output of the inverter. The above relationship is applied to a three phase inverter (e.g., inverter 188) in a symmetrical fashion (e.g., triple harmonic common mode injection for a three phase inverter) to shift conduction losses among the semiconductor devices in the inverter (e.g., 188) when thermal averaging of the conduction losses among the semiconductor devices is not able to keep the thermal variation or ripple, which can vary with the fundamental frequency, minimized between or among the semiconductor devices.

For a three phase inverter in sector one of the SVPWM, a common mode duty cycle defines the duty cycle of all three phases as:

$$\text{Common Mode Duty Ratio} = \frac{t_7}{T_s},$$

where $t_7$ is defined as the active or on-time duration for the high-side semiconductor devices (Q1, Q3, Q5) of all three phases (A, B and C), and where $T_s$ is the total cycle duration of a switching cycle for any given SVPWM sector. For example for sector one of SVPWM, the $T_s=t_0+t_1+t_2+t_7$, where $t_0$ is defined as the active or on-time duration for all low-side switches (Q2, Q4, Q6) that are substantially simultaneously in an on-state; $t_1$ is defined as the active or on-time duration for the phase A high-side switch (Q1), phase B low-side switch (Q4), and phase C low-side switch (Q6) that are substantially simultaneously in an on-state; $t_2$ is defined as the active or on-time duration for phase A high-side switch (Q1), phase B high-side switch on (Q3) and phase C low-side switch (Q6) that are substantially simultaneously in an on-state; and $t_7$ is defined as the time duration for all three phases of high-side switches (Q1, Q3, Q5) that are substantially simultaneously in an on-state. The output voltage at the phase output terminals are zero for $t_0$ and $t_7$, such that the driver stage to the inverter 188 can adjust $t_0$ and $t_7$ without changing the output current (or its phase relationship) provided at the phase output terminals 199 that controls the electric machine (e.g., motor 117). However, the duration of $t_1$ and $t_2$ must remain constant to avoid unwanted changes to the machine phase current at the output terminals 199. The phase duty ratios at Phase A terminal 355, Phase B terminal 357, and Phase C terminal 359 are defined by the following equations, respectively:

$$\text{Phase } A \text{ Duty Ratio} = \frac{t_1 + t_2 + t_7}{T_s}$$

$$\text{Phase } B \text{ Duty Ratio} = \frac{t_7}{T_s}$$

$$\text{Phase } C \text{ Duty Ratio} = \frac{t_2 + t_7}{T_s}$$

where $t_1$, $t_2$, $t_7$ and $t_0$ are the time durations of certain semiconductor switches being on or active, as defined above.

Accordingly, for sector one of the SVPM, duration $t_7$ of the vector or mode in which all three high-side switches (Q1, Q3, Q5) and $t_0$ of the vector or mode in which all three low-side switches (Q2, Q4, Q6) are on or active can be used to adjust the common mode duty ratio; hence, to manage the temperature of each of the semiconductor switches (Q1 through Q6, inclusive) and diodes (D1 through D6, inclusive) in the inverter 188.

Accordingly, for sector one of the SVPWM, the PWM common mode duty ratio is increased if $t_0$ duration is decreased or if $t_7$ duration is increased. Conversely, for sector 1 of the SVPWM, the common mode duty ratio is decreased if $t_0$ is increased or if $t_7$ is decreased.

The thermal adjustment module 130 can adjust the duration of the peak current in a switch by altering the duty cycle of the switching device (e.g., Q1-Q6, inclusive) with the highest temperature (e.g., estimated or determined based on the product of power losses ($P_j$) and thermal impedance ($\Theta$)). The other semiconductor devices (e.g., other than the hottest semiconductor device with the altered duty cycle) that are under conduction (defined by the operational mode or modulation of the inverter 188) will take on more conduction losses because of the alteration in the common mode duty cycle offset to benefit the semiconductor device that is the hottest. As the current peak moves through different semiconductor devices in the inverter 188 during a time period (e.g., an interval as short as one cycle of phase current for one phase or each phase for a multi-phase inverter), the common mode adjustment of the thermal adjust module 130 will change to benefit the semiconductor device that has the highest junction temperature for the time period. The average current in each semiconductor device is determined by the differential duty cycle between the phases (e.g., difference between the duty cycles of any two phases) and the load. The benefit of the adjustment is only observed at low fundamental frequencies, at or below a threshold fundamental frequency, where the thermal time constants are longer than the fundamental frequency. At higher frequencies above a threshold fundamental frequency, the thermal time constants are enough to average the peak-to-peak temperature fluctuations to a level that typically isn't really significant in the operation of the inverter.

The average current in each semiconductor device will remain the same over a cycle of the phase output because the average of the common mode offset signal waveform is 0.5 over the cycle. If the average is not 0.5, the average power loss among the devices will not be equal; that is, the power loss in Q1 wont equal the power loss in Q2. If the devices are equivalent devices, the power loss in Q1 should be equal to the power loss in Q2. Each semiconductor device will have heat to dissipate that is created by a balanced or centered duty ratio (e.g., waveform centered about a central value associated a 0.5 duty ratio). However, some devices might have packages, placement (e.g. near a heat sink or cooler portion of a circuit board), internal on-resistance (e.g., drain-source resistance, $R_{DS}$, for field effect transistors or collector-emitter resistance $R_{CE}$ for bipolar transistors), or other design characteristics that allows for greater thermal dissipation or thermal performance, whereas other devices may have different maximum operating temperatures or acceptable maximum rise in operating temperatures.

The peak adjusted cycle data 131 represents a characterization of the inverter or its components. In one embodiment, the peak adjusted cycle data 131 may depend upon the fundamental frequency of the inverter. Each peak adjusted duty cycle datum of the peak adjusted cycle data 131 may be associated with a corresponding fundamental frequency and a carrier frequency for each inverter. For example, at low fundamental frequencies near the threshold, the duty cycle or common mode offset function may deviate approximately 0.20 to approximately 0.25 from its central value, as indicated in FIG. 12B, whereas at lower fundamental frequencies than the threshold that are at or near stall speed (e.g., from approximately 2 Hz to approximately 0.5 Hz), the duty cycle or common mode offset function (530) may deviate approximately 0.4 to approximately 0.48 from its central value, as indicated in FIG. 13B. If the peak adjusted duty cycle data 131 varies by (or as a function of) fundamental frequency or carrier frequency of the inverter, the adjusted duty ratio or adjusted duty cycle is more than a direct current offset of the duty ratio or duty cycle and varies by the fundamental frequency or carrier frequency. For example, each model number of an inverter may be characterized or tested in the factory, field, lab or otherwise to establish peak adjusted cycle data 131.

In one embodiment, the peak adjusted cycle data 131 represents a peak duty cycle (i.e., PeakDutyCycle), or a weight factor to establish a peak amplitude and slope (e.g., rise rate) of the adjusted duty ratio waveform or common mode offset waveform, that is based on any of the following inverter factors: (1) thermal impedance of one or more semiconductor devices, (2) estimated temperatures of one or more semiconductor devices, (3) power dissipation of one or more semiconductor devices, (4) fundamental frequency of the inverter output 199, and (5) characterization or tests to determine the above inverter factors.

In one embodiment, if the peak adjusted cycle data 131 is not stored or available in the data storage device, the thermal adjustment module 130 or the data processor may estimate or determine in real-time, dynamically, or on-the-fly the peak adjusted cycle data 131.

The thermal adjustment module 130 facilitates the injection of an adjusted time-varying, common mode voltage waveform (e.g., a substantially triangular waveform, trapezoidal waveform, with or without a phase shift) that can have a peak amplitude and slope that varies by fundamental frequency of the inverter. Although the common mode offset function is illustrated as a substantially triangular waveform in the drawings (e.g., FIG. 12B), in alternate embodiments the common mode offset function may comprise squarewave (with or without a phase shift) that is compatible with the applicable semiconductor devices (e.g., device thermal dissipation and power losses). For example, the thermal adjustment module 130 facilitates the injection of a control signal derived from the common mode voltage waveform (e.g., 528 or 530 of FIG. 13B) to the PWM generation module 112 in a manner that does not change the phase-to-phase differential voltage applied to the motor.

The adjusted common mode voltage waveform supports heat distribution among the semiconductor devices (e.g., switches Q1-Q6, diodes D1-D6, or both) to support operation at higher output current than with standard modulation methods.

In one example of shifting the duty cycle, if the first phase (Phase A) low-side diode (D2) is conducting, the thermal adjustment module 130 can increase the (common mode) duty cycle to decrease the duration of the current conduction time (heat generated) in the low-side diode (D2) of the first phase and increase the duration of current conduction time (heat generated) in the second phase high-side diode (D3) and the third phase high-side diode (D5). For example, the thermal adjustment module can shift the heat from a diode of one phase to the diodes of other phases such that the hottest diode with the highest temperature parameter (e.g., highest temperature or highest temperature differential) remains below a maximum target temperature parameter or within a temperature range.

In another example of shifting the duty cycle, if the first phase (Phase A) high-side switch (e.g., Q1) is conducting, the thermal adjustment module 130 can decrease the duty cycle to increase the duration of the current conduction time (heat generated) in the (Phase A) low-side switching device (e.g., diode D2 for IGBT's or switch Q2 for a FET) and increase duration of the current conduction time (heat generated) in the other phase switching devices (e.g., Q3, Q5, D4 and D6). For example, the thermal adjustment module can shift the heat from a high-side switching device of one phase to the low-side switching device of the same phase and the switching devices of other phases such that the hottest device (e.g., at an output current level of the phases) with the highest temperature remains below a maximum target temperature or within a temperature change range. The switching device refers to a transistor switch, a diode, or both. Further, the thermal adjustment module 130 can complete the above process iteratively with the next hottest switch with the next highest temperature such that it remains below a maximum target temperature or within a temperature range, and so on until the temperature of all switches is generally equalized or falls within a certain tolerance of each other.

Figure 2:
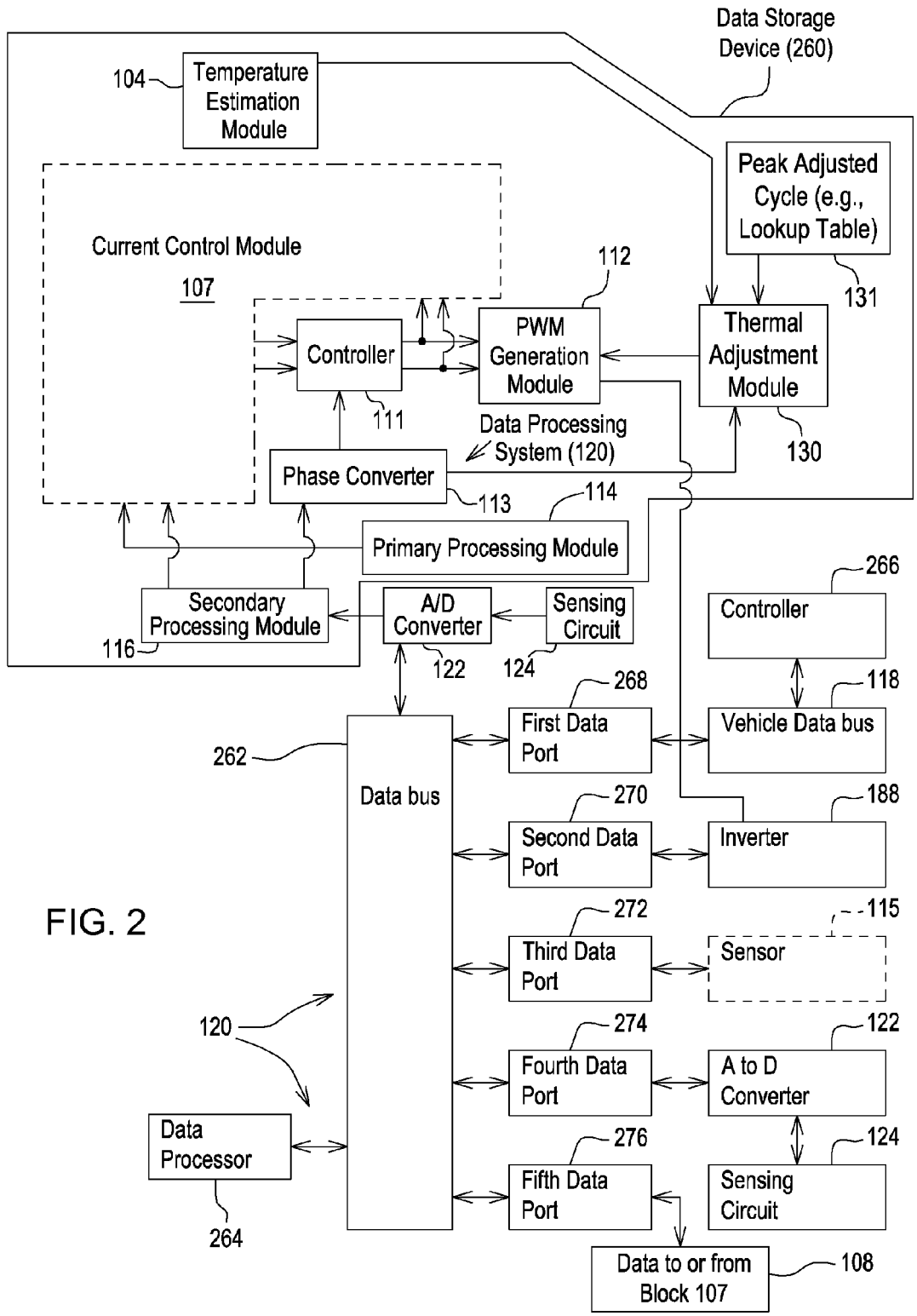
FIG. 2 is a block diagram of an electronic data processing system consistent with FIG. 1A and FIG. 1B.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter 188; the third data port 272 may be coupled to the sensor 115; the fourth data port 274 may be coupled to the analog-to-digital converter 122; and the fifth data port 276 may be coupled to the current control module 107 to receive data to or from block 107. The analog-to-digital converter 122 is coupled to the sensing circuit 124.

In one embodiment of the data processing system 120, the current control module 107 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the current control module 107 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the data processing system 120.

In one embodiment, a data storage device 260 stores the peak adjusted cycle data 130 in a file, data record, look-up table, or other data structure and one or more software modules, converters, managers, controllers and/or summers as software instructions, files, data records or other data structures. The data processor 264 can read, retrieve, process or execute any software instructions, files, data records, or other data structures in the data storage device 260.

Figure 3:
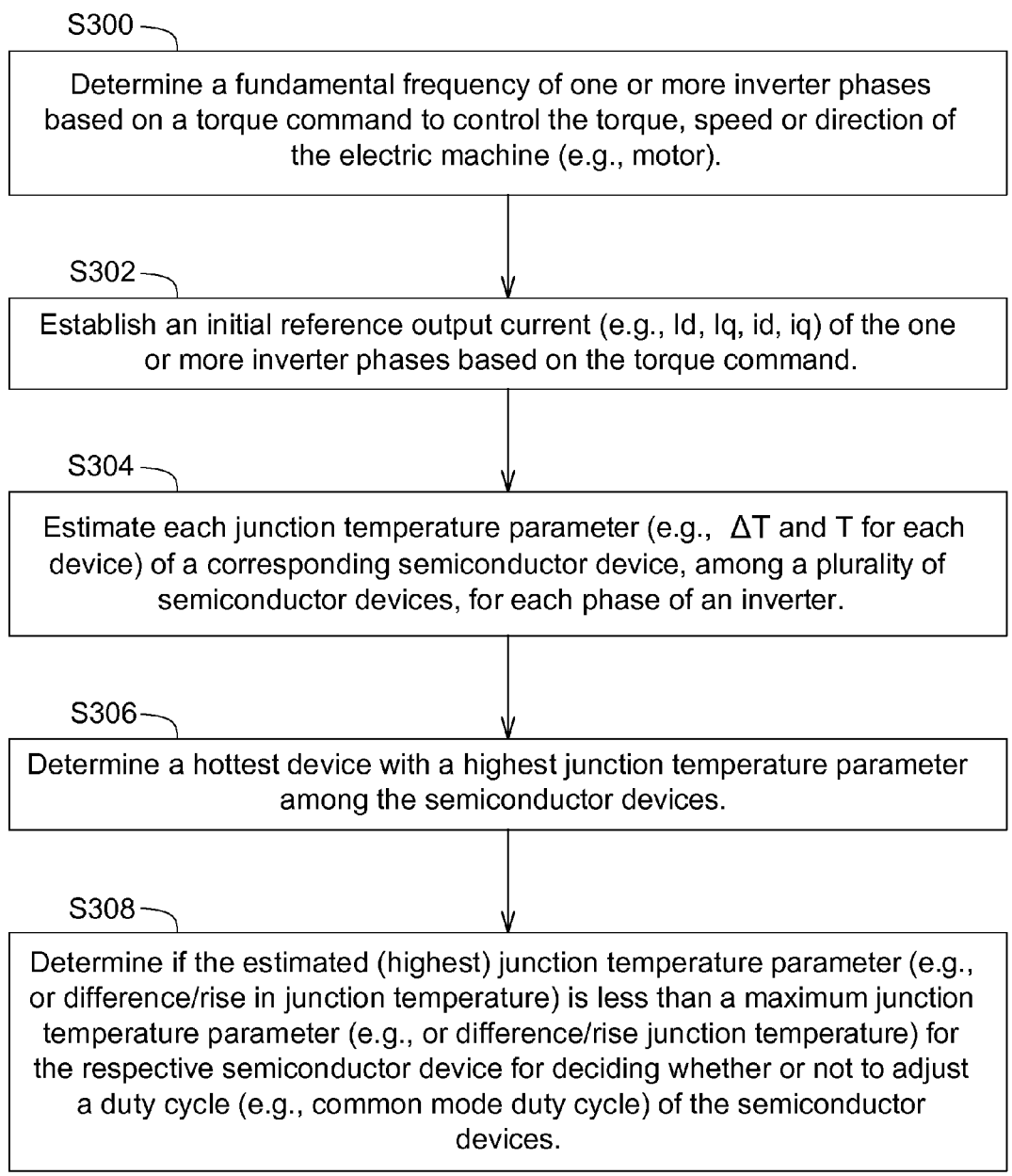
FIG. 3 is a flow chart of a first embodiment of a method and inverter with thermal management for controlling an electric machine.

FIG. 3 is a flow chart of a first embodiment of a method and inverter with thermal management for controlling an electric machine (e.g., motor 117). The method of FIG. 3 begins in step S300.

In step S300, the current control module 107, the data processor 264, or the data processing system 120 determines a fundamental frequency of one or more inverter phases (at inverter outputs 199) based on a torque command to control the torque, speed, or direction of the electric machine (e.g., motor 117).

In step S302, current control module 107, the current regulation controller 111, or the data processing system 120 establishes an initial reference output current of the one or more inverter phases (at inverter outputs 199) based on the torque command (e.g., from the vehicle data bus 118) or other input data. For example, the data processing system 120 may establish the initial reference output current of one or more phases based on the torque command and other available input data such as: (1) voltage of direct current voltage bus ($V_{DC}$) that feeds the inverter 188 and its semiconductor devices (Q1-Q6, and D1-D6), (2) a frequency of the pulse width modulation signal outputted for one or more phase outputs 199 of the inverter 188, (3) a fundamental frequency of the output signal (e.g., substantially sinusoidal output signal) of one or more phases of the inverter 188, (4) temperature of coolant of a cooling system for cooling one or more semiconductor devices (Q1-Q6, and D1-D6) of the inverter 188, (5) power factor (e.g., typically within a range of 0.5 to 1) of the inverter, (6) whether the inverter 188 is operating in a motoring mode (motor control) or generating mode (electricity generation/rectification) and (7) modulation control scheme of the inverter such as space vector pulse width modulation (SVPWM).

In step S304, the temperature estimation module 104 or the data processing system 120 estimates the junction temperature parameter of a corresponding semiconductor device, among a plurality of semiconductor devices, for each phase of an inverter; where, for example, the inverter is operating in accordance with an initial reference output current of the one or more inverter phases. As used throughout this document, the junction temperature parameter means one or more of the following, for example: (1) a difference or rise in junction temperature (above a reference temperature, such as ambient temperature or off-state of the inverter 188) of a respective semiconductor device or a group of semiconductor devices in the inverter, (2) an absolute junction temperature of a respective semiconductor device or a group of semiconductor devices in the inverter, (3) a range in the junction temperature of one or more corresponding semiconductor devices in the inverter, or (4) an observed or measured junction temperature based on sensor readings of a temperature sensor 103 (e.g., associated with one or more semiconductor devices or a circuit board on which the semiconductor devices are mounted). As used throughout this document, the semiconductor device may refer to any of the semiconductor switches (Q1 through Q6, inclusive), any of the semiconductor diodes (D1 through D6, inclusive), or both.

In step S306, the temperature estimation module 104, the thermal adjustment module 130, or the data processing system 120 determines a hottest device (e.g., at an output current level) with a highest junction temperature parameter among the semiconductor devices (e.g., among Q1-Q6, and D1-D6).

In an alternate embodiment, if the method of FIG. 3 is executed iteratively, the next hottest device with a next highest junction temperature among the semiconductor devices can be considered in each successive iteration of the method or subset of steps of the method of FIG. 3.

In step S308, the thermal adjustment module 130 or the data processing system 120 determines if an estimated junction temperature parameter is less than a maximum junction temperature parameter for a respective semiconductor device for deciding whether or not to adjust a duty cycle (e.g., common mode duty cycle) of the semiconductor devices. A maximum junction temperature parameter may represent one or more of the following: (1) a maximum difference or maximum rise (above a reference temperature, such as ambient temperature or an off-state of the inverter) in junction temperature of a respective semiconductor device or a group of semiconductor devices in the inverter, (2) an absolute maximum junction temperature of a respective semiconductor device or a group of semiconductor devices in the inverter, (3) an upper limit associated with a range in the junction temperature of one or more corresponding semiconductor devices in the inverter, (4) a maximum junction temperature based on a semiconductor manufacturer's specifications, or (5) maximum junction temperature based on operational data from empirical testing or studies of a respective semiconductor device installed in the operating environment of the particular inverter.

For example, in step S308 the thermal adjustment module 130 or the data processing system 120 determines if an estimated junction temperature parameter is less than a maximum junction temperature parameter for a respective semiconductor device for deciding whether or not to adjust a duty cycle (e.g., common mode duty cycle) of the semiconductor devices from a neutral or balanced duty cycle (e.g., common mode duty cycle of 0.5, or where the duty cycle waveform is centered about a pulse width modulation associated with a 0.5 duty cycle) that allocates active time substantially equally between the (complementary) semiconductor switches of the inverter or from a prior adjusted duty cycle that allocates active time between the semiconductor switches to compensate for differences in one or more of the following thermal performance parameters: (1) thermal impedance ($\Theta$) of the semiconductor device (e.g., switch (Q1-Q6) or diode (D1-D6)), and (2) power dissipation (P) (e.g., conduction loss or resistance of the ON state) of the semiconductor device. Further, the thermal adjustment module 130 or the data processing system 120 can adjust the duty cycle by shifting the peak amplitude of the duty cycle waveform, the phase of the duty cycle waveform, or both to allocate or distribute heat generated symmetrically, asymmetrically, between or among the semiconductor devices (e.g., to compensate for thermal performance parameters of the semiconductor devices.)

In alternate embodiments, the thermal adjustment module 130 or the data processing system 120 can adjust or provide a direct current (DC) offset (e.g., constant DC offset signal to the common mode offset function) of the duty cycle waveform at a stall condition of the motor.

Figure 4:
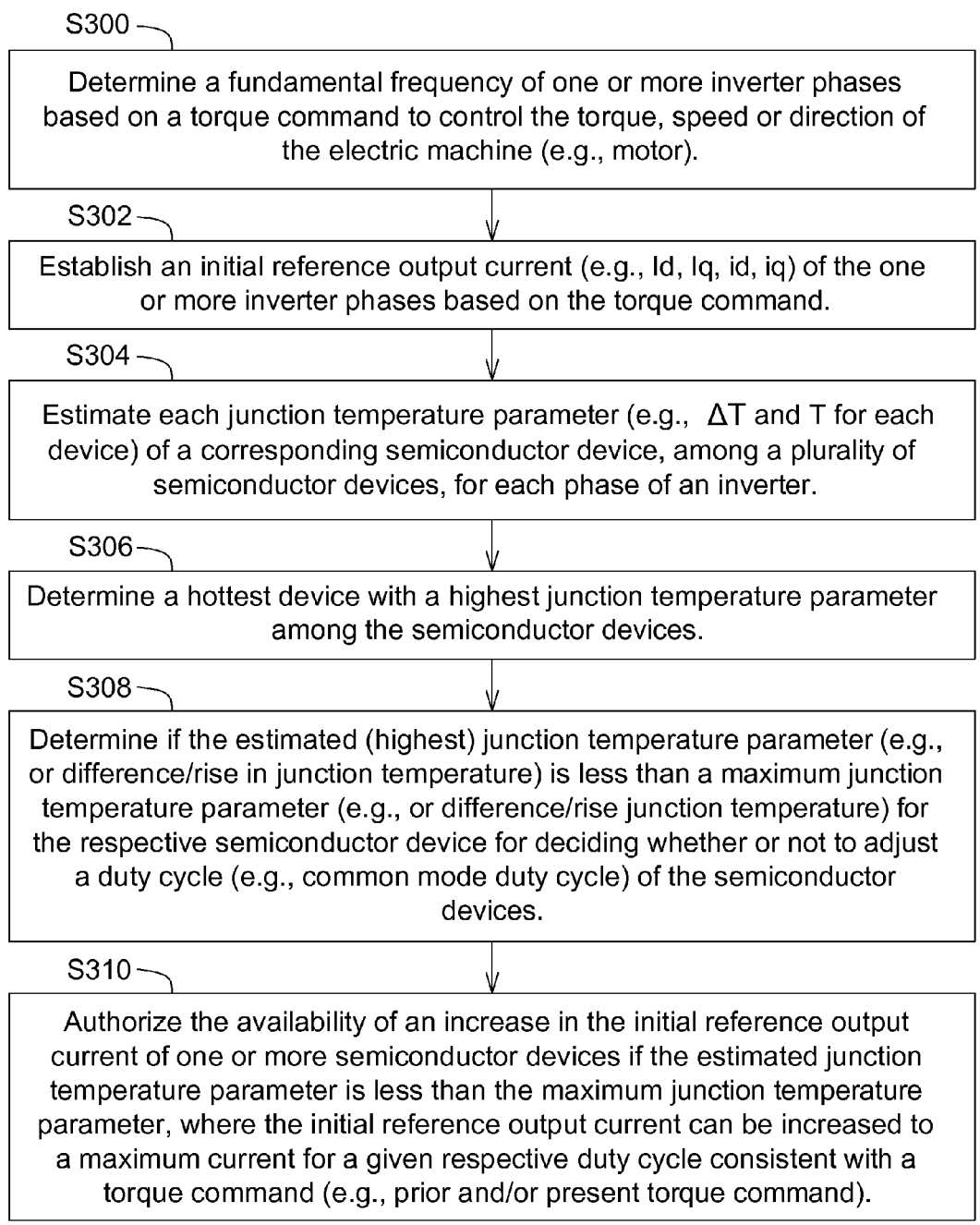
FIG. 4 is a flow chart of a second embodiment of a method and inverter with thermal management for controlling an electric machine.

FIG. 4 is a flow chart of a second embodiment of a method and inverter with thermal management for controlling an electric machine. The flow chart of FIG. 4 is similar to the flow chart of FIG. 3 except the method of FIG. 4 further comprises step S310. Like reference numbers in FIG. 3 and FIG. 4 indicate like steps or procedures.

In step S310, the thermal adjustment module 130, or the data processing system 120 authorizes the availability of an increase (or difference) in the initial reference output current of one or more semiconductor devices (or a corresponding phase associated with the one or more semiconductor devices) if the estimated junction temperature parameter is less than the maximum junction temperature parameter and where the initial reference output current can be increased to a maximum current for a given respective duty cycle (e.g., a present common mode duty cycle), consistent with a torque command (e.g., prior and/or present torque command) and any applicable input data. Even if the increase (or difference) in the initial reference output is within available capacity of the inverter, such available capacity may not be used unless the load on the motor and the torque command require such available capacity, such as at or near stall speed of the rotor of the motor 117 or if the fundamental frequency of the inverter at outputs 199 is less than a threshold fundamental frequency for one or more phases.

For purposes of step S310, the input data can include any of the following: (1) voltage of direct current voltage bus ($V_{DC}$) that feeds the inverter 188 and its semiconductor devices (Q1-Q6, and D1-D6), (2) a frequency of the pulse width modulation signal outputted for one or more phase outputs 199 of the inverter 188, (3) a fundamental frequency of the output signal (e.g., substantially sinusoidal output signal) of one or more phases of the inverter 188, (4) temperature of coolant of a cooling system for cooling one or more semiconductor devices (Q1-Q6, and D1-D6) of the inverter 188, (5) power factor (e.g., typically within a range of 0.5 to 1) of the inverter, (6) whether the inverter 188 is operating in a motoring mode (motor control) or generating mode (electricity generation/rectification) and (7) modulation control scheme of the inverter such as space vector pulse width modulation (SVPWM).

Figure 5:
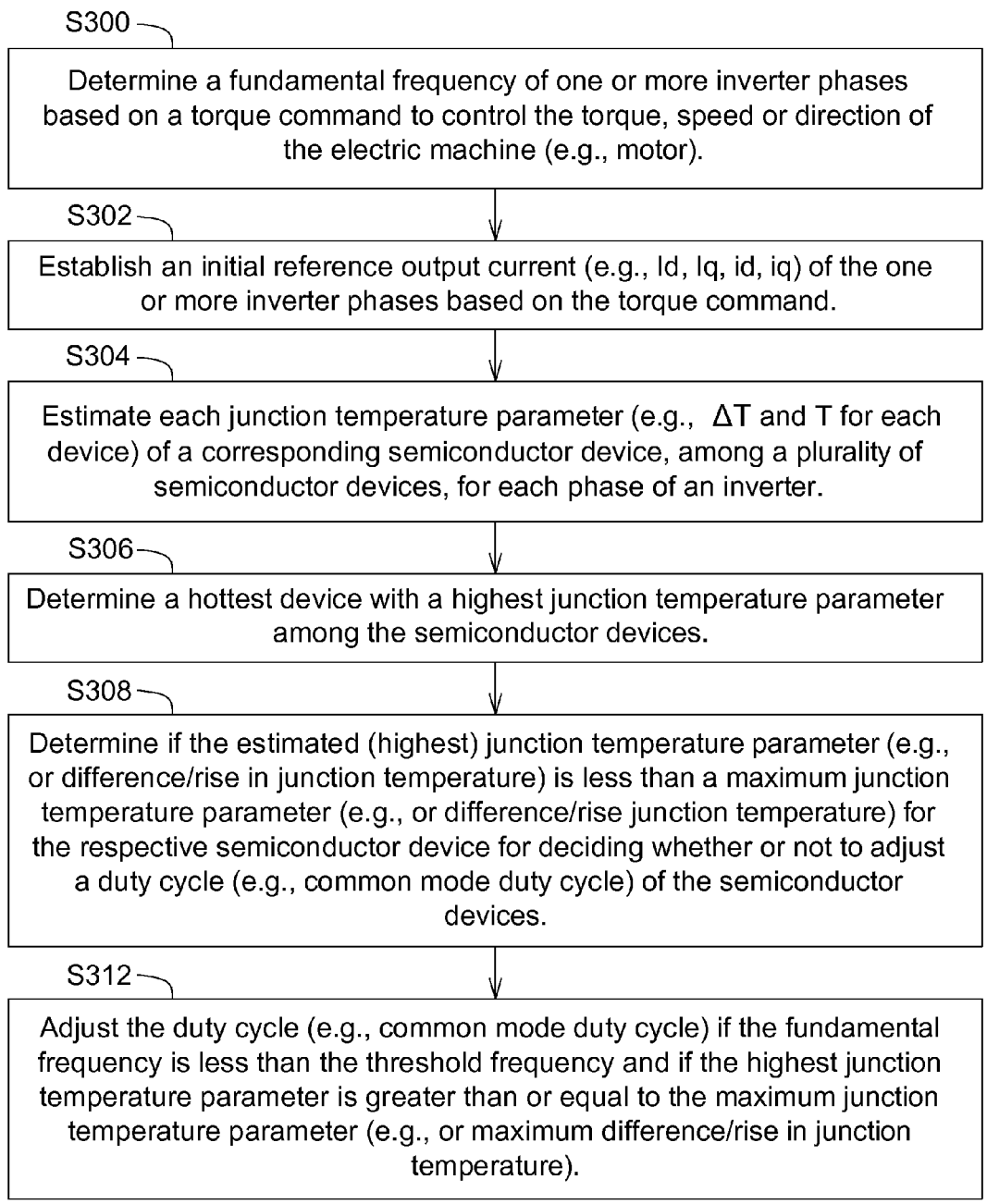
FIG. 5 is a flow chart of a third embodiment of a method and inverter with thermal management for controlling an electric machine.

FIG. 5 is a flow chart of a third embodiment of a method and inverter with thermal management for controlling an electric machine. The flow chart of FIG. 5 is similar to the flow chart of FIG. 3 except the method of FIG. 5 further comprises step S312. Like reference numbers in FIG. 3 and FIG. 5 indicate like steps or procedures.

In step S312, the thermal adjustment module 130, or the data processing system 120 adjusts the duty cycle (e.g., common mode duty cycle) if the fundamental frequency is less than the threshold frequency and if the highest junction temperature is greater than or equal to the maximum junction temperature (e.g., or maximum difference/rise in junction temperature). For example, the thermal adjustment module 130 or the data processing system 120 dynamically adjusts the duty cycle or duty cycle function as follows (e.g., to form an adjusted duty cycle common mode offset function or adjusted duty cycle by using one or more of the following to impact control data inputted to the PWM generation module 112 or the output of the PWM generation module 112): (1) by adjusting or modifying the common mode offset function or adjusted duty cycle waveform to change the peak amplitude or deviation in the duty cycle from a central axis; (2) by adjusting the peak amplitude of the common mode offset function or adjusted duty cycle waveform, (3) by adjusting the phase angle or change in phase angle of the common mode offset function or adjusted duty cycle waveform relative to one more phase signals at output terminals 199, (4) by adjusting a direct current (DC) offset to the common mode offset function or adjusted duty cycle waveform at stall condition of the motor 117 or electrical device, (5) by adjusting the frequency of the direct current (DC) offset function to be an integer multiple or a harmonic (e.g., an odd harmonic or third harmonic) of the fundamental frequency of the phase signals at output terminals 199, (6) by adjusting any of the foregoing items that can vary (e.g., for each sampling interval) the common mode offset function with any change in fundamental frequency, modulation state (e.g., active switching states), phase angle of inverter output, or any of combination of the foregoing items.

In the inverter illustrated in FIG. 1B, the semiconductor devices comprise semiconductor switches (e.g., insulated gate bipolar transistor (IGBT)) and semiconductor diodes. Here, each diode can be referred to as an antiparallel switch device. If the switches and diodes are not matched in capability (e.g., because of the particular specifications of the semiconductor devices and the inverter design), one of the semiconductor devices may limit the operational capability more significantly than the other semiconductor. The mismatch between the semiconductor devices (e.g., diodes and switches) can result in a current output for the inverter that is lower than what could be achieved if the junction temperature operating point in the devices was more similar across the operating points.

For example, in step S312 the thermal adjustment module 130 or the data processing system 120 coordinate with the pulse width modulation generation module 112, the inverter 188, or both to provide an adjusted duty cycle that shifts the power dissipation to one or more semiconductor devices (e.g., Q1-Q6 or D1-D6) that have capability to handle more dissipation, while still providing the full differential voltage capability at the inverter output 199 required for operation. The active power durations; hence the heat dissipation, is shifted in a way that can move the power from either one or more diodes (e.g., D1-D6) to one or more semiconductor switches (e.g., Q1-Q6) or from one or more semiconductor switches (e.g., Q1-Q6) to one or more diodes (e.g., D1-D6).

Step S312 may be carried out in accordance with various techniques which may be applied alternately or cumulatively. As used in the context of step S312, opposite means low side versus high side semiconductor devices, or vice versa in the inverter. Under a first technique, the thermal adjustment module 130 or the data processing system 120 adjusts the duty cycle to shift losses and therefore move heat dissipation within a phase of the inverter 188 between a low-side semiconductor device and a high-side semiconductor device.

Under a second technique, the thermal adjustment module 130 or the data processing system 120 adjusts the duty cycle to shift losses and therefore move heat dissipation within a phase of the inverter 188 between a semiconductor switch and an opposite diode associated with an opposite semiconductor switch in the same phase.

Under a third technique, the thermal adjustment module 130 or the data processing system 120 adjusts the duty cycle to shift losses and therefore move heat dissipation within a phase of the inverter 188 from a semiconductor switch to an opposite diode associated with an opposite semiconductor switch in the same phase.

Under a fourth technique, the thermal adjustment module 130 or the data processing system 120 adjusts the duty cycle to shift losses and therefore move heat dissipation within a phase of the inverter 188 from a diode to an opposite semiconductor switch associated with an opposite diode in the same phase.

Figure 6:
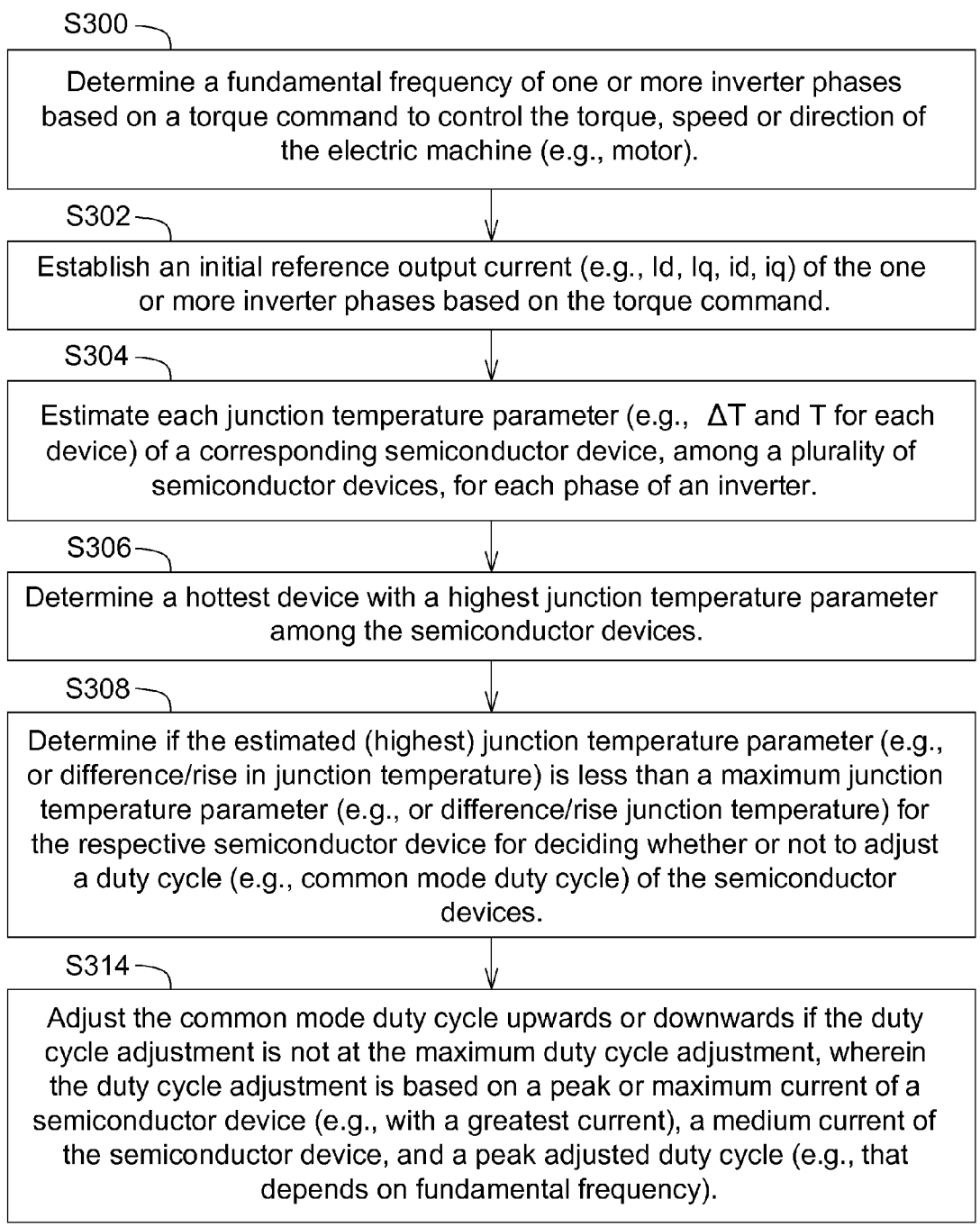
FIG. 6 is a flow chart of a fourth embodiment of a method and inverter with thermal management for controlling an electric machine.

FIG. 6 is a flow chart of a fourth embodiment of a method and inverter with thermal management for controlling an electric machine. The flow chart of FIG. 6 is similar to the flow chart of FIG. 3 except the method of FIG. 6 further comprises step S314. Like reference numbers in FIG. 3 and FIG. 6 indicate like steps or procedures.

In step S314, the thermal adjustment module 130, or the data processing system 120 adjusts the duty cycle (e.g., common mode duty cycle) upwards or downwards if the duty cycle adjustment is not at the maximum duty cycle adjustment (e.g., upper limit or lower limit), where the duty cycle adjustment is based one or more of the following: (1) on a peak or maximum current of a semiconductor device (e.g., with a greatest current), (2) a medium current of the semiconductor device, and (3) peak adjusted duty cycle (e.g., that depends on fundamental frequency).

Step S314 may be carried out in accordance with various techniques, which may be applied alternately or cumulative. Under a first embodiment, the thermal adjustment module 130, or the data processing system 120 adjusts the duty cycle (e.g., common mode duty cycle) upwards if the duty cycle adjustment is not at the maximum duty cycle adjustment (e.g., upper limit or lower limit) and if the hottest device among the semiconductor devices is not a high-side semiconductor switch (Q1, Q3, Q5) or if the hottest device among the semiconductor devices is not a high-side diode (D1, D3, D5).

Under a second embodiment, the thermal adjustment module 130, or the data processing system 120 adjusts the duty cycle (e.g., common mode duty cycle) downwards if the duty cycle adjustment is not at the maximum duty cycle adjustment (e.g., upper limit or lower limit) and if the hottest device among the semiconductor devices is a high-side semiconductor switch (Q1, Q3, Q5) or is a high-side diode (D1, D3, D5), where the duty cycle adjustment is based on one or more of the following: (1) the peak or maximum current in the semiconductor device (e.g., switch or diode) or at one phase output terminal 199 with the highest current among the three phases of the inverter 188 during a cycle, (2) a medium current of the semiconductor device or at one phase output 199 that is between a lowest phase current output and a highest phase current output, (3) peak adjusted duty cycle data 131, where the peak adjusted duty cycle data 131 can be based on factors such as fundamental frequency, thermal impedance of the semiconductor devices, power dissipation of the semiconductor devices and temperature parameters of the semiconductor devices. In one embodiment, the peak adjusted duty cycle data 131 is stored in a data storage device and is determined by a characterization of the inverter.

Figure 9:
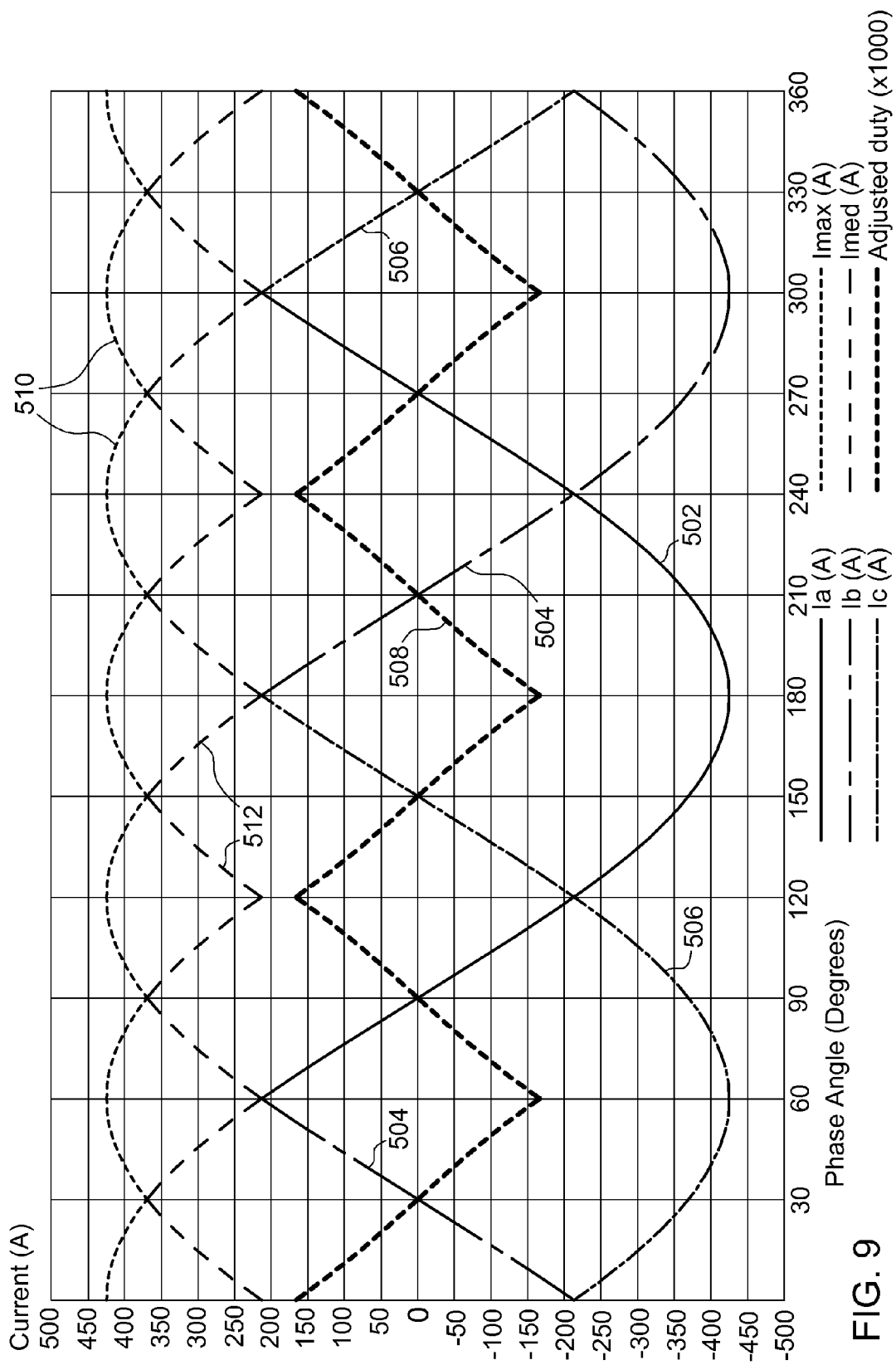
FIG. 9 is chart of current output waveforms for each phase terminal and a corresponding driver waveform (e.g., substantially triangular waveform) as input to one of the input phase terminals that makes the maximum average diode current substantially equal to the medium average diode current.

For example, in step S314 the thermal adjustment module 130 or the data processing system 120 adjusts the duty cycle (e.g., common mode duty cycle) upwards or downwards provides an adjusted common mode duty ratio, called "Adjusted Duty," in accordance with the following equation:

$$|AdjustedDuty| = 3 \times \frac{|I_{max}| - |I_{medium}|}{|I_{max}| + |I_{medium}|} \times PeakAdjustedDuty$$

where "PeakAdjustedDuty" is the desired peak adjusted duty cycle data 131 (e.g., multiplier) that is retrieved or read from a look-up table or other data record in a data storage device 260 of the data processing system 120, $I_{max}$ is the maximum phase current (e.g., collector current or forward biased diode current) of the semiconductor device (e.g., device with greatest current) of the currents in phases A (355), B (357), C (359) of FIG. 1B, and $I_{medium}$ is the medium phase current of the semiconductor devices (e.g., at A (355), B (357), C (359)) that is less than the maximum current but greater than the minimum phase current. These values of maximum phase current, medium phase current, or other phase currents are instantaneous and the maximum and medium values can change continuously. FIG. 9 shows illustrative examples of the waveforms described in this document. For, example, $I_{max}$ may be the highest current or maximum current of the three phases; $I_{medium}$ may be the medium current of the three phases that is between the phase with the lowest current and the highest current. In one embodiment, the maximum current and the medium current may be estimated by the output phase current at output terminals 199, by sensing circuit 124 or by one or more current sensors coupled to one or more switched terminals of any particular high-side semiconductor device or low-side semiconductor device.

Figure 7:
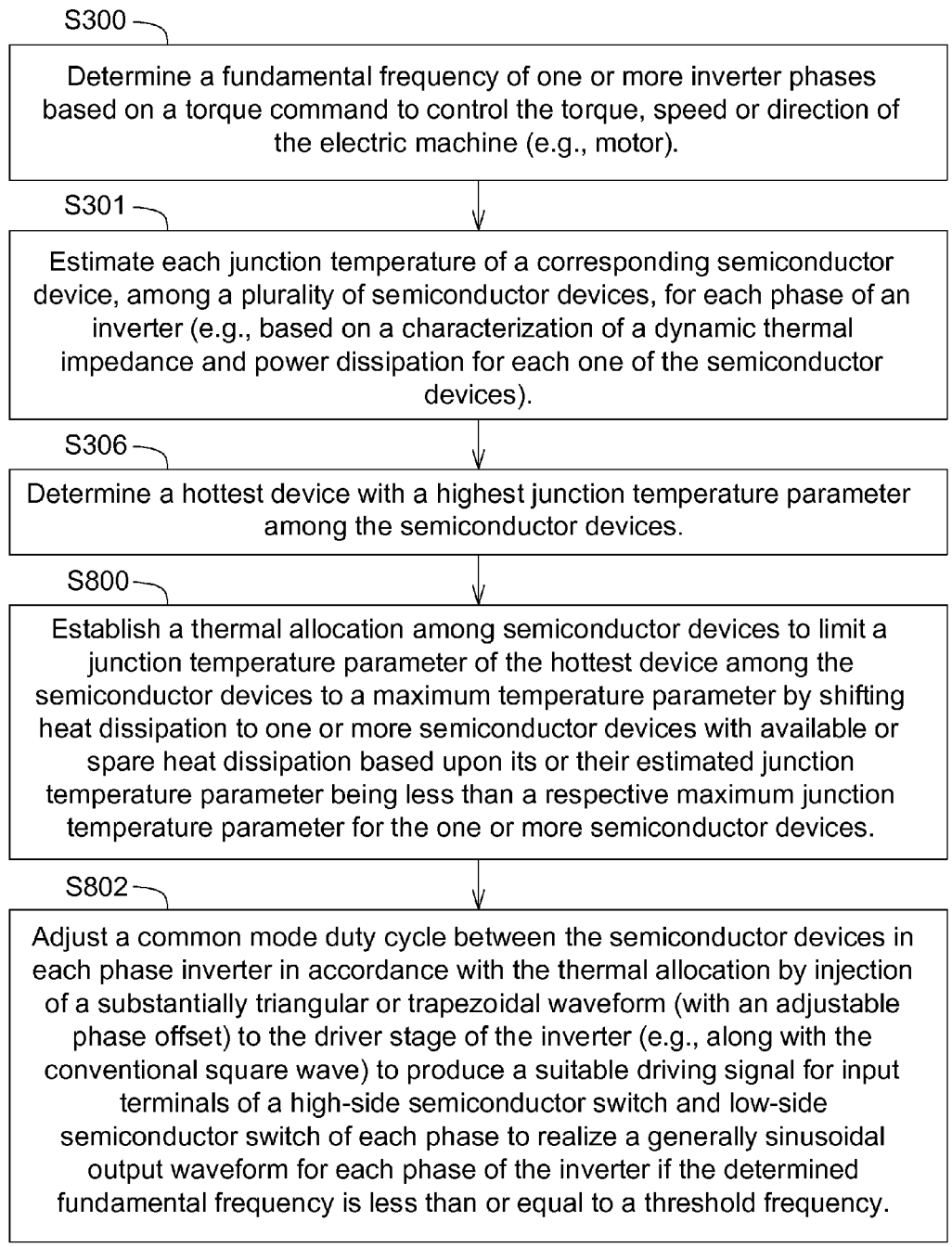
FIG. 7 is a flow chart of a fifth embodiment of a method and inverter with thermal management for controlling an electric machine.

FIG. 7 is a flow chart of a fifth embodiment of a method and inverter with thermal management for controlling an electric machine. The method of FIG. 7 begins in step S300.

In step S300, current control module 107, the current regulation controller 111, or the data processing system 120 establishes an initial reference output current of the one or more inverter phases 199 based on the torque command.

In step S301, the temperature estimation module 104 or the data processing system 120 estimates the junction temperature parameter of a corresponding semiconductor device, among a plurality of semiconductor devices (Q1 through Q6, inclusive and D1-D6, inclusive), for each phase of an inverter 117. As used through the method of FIG. 7 and elsewhere in this document, the junction temperature parameter means one or more of the following: (1) a difference or rise in junction temperature (above a reference temperature, such as ambient or an off-state of the inverter) of a respective semiconductor device or a group of semiconductor devices in the inverter, (2) an absolute junction temperature of a respective semiconductor device or a group of semiconductor devices in the inverter, (3) a range in the junction temperature of one or more corresponding semiconductor devices in the inverter, or (4) an observed or measured junction temperature based on sensor readings of a temperature sensor 103.

In step S301, the temperature estimation module 104 or the data processing system estimates the junction temperature parameter based on a characterization of a dynamic thermal impedance and power dissipation for each one of the semiconductor devices.

In step S306, the temperature estimation module 104, the thermal adjustment module 130, or the data processing system 120 determines a hottest device with a highest junction temperature among the semiconductor devices.

In an alternate embodiment, if the method of FIG. 7 is performed iteratively, the temperature estimation module 104, the thermal adjustment module 130 or the data processing system 120 determines a next hottest device with a next highest junction temperature among the semiconductor devices.

In step S800, the thermal adjustment module 130 or the data processing system 120 establishes a thermal allocation among semiconductor devices (Q1-Q6, and D1-D6) to limit a junction temperature parameter of the hottest device among the semiconductor devices to a maximum temperature parameter by shifting heat dissipation to one or more semiconductor devices with available or spare heat dissipation based upon its or their estimated junction temperature parameter being less than a respective maximum junction temperature parameter for the one or more semiconductor devices.

In step S802, the thermal adjustment module 130 or the data processing system 120 adjusts a common mode duty cycle between the semiconductor devices in each inverter phase in accordance with the thermal allocation by injection of a substantially triangular, substantially trapezoidal waveform, a rectangular wave, or square-wave (e.g., with or without phase shift and usually at a third harmonic frequency with respect to the fundamental frequency) to the pulse width generation module 112, which in turn provides the duty cycle waveform to the driver stage 177 of the inverter 188. For example, the substantially triangular, substantially trapezoidal waveform, or other waveform can be injected alone, or together with a conventional square wave signal, or another control signal (e.g., a static or time-varying direct current (DC) offset) to the pulse width generation module 112 to produce a suitable driving signal (e.g., via the driver 177) for input terminals of a high-side semiconductor switch (Q1, Q3, Q5) and a low-side semiconductor switch (Q2, Q4, Q6) of each phase to realize a generally sinusoidal output waveform for each phase of the inverter 188 if the determined fundamental frequency is less than or equal to a threshold frequency (e.g., even at or near stall speed of the rotor of the motor 117).

In step S802, at fundamental frequencies below the threshold frequency, the thermal adjustment module 130 or the data processing system 120 can adjust the duty cycle between the (high-side and low-side) semiconductor devices in each inverter phase independently of (or together with) the semiconductor devices in other phases, in accordance with the thermal allocation by injection of a substantially triangular, substantially trapezoidal waveform, a rectangular wave, or square-wave, which is referred to as the common mode offset function waveform or DC offset function waveform or zero states, with adjustable peak amplitude to the pulse width generation module 112. Further, the the thermal adjustment module 130 or the data processing system 120 can adjust the phase offset or phase shift of the common mode offset function waveform to be in phase or any phase angle between zero and three hundred sixty degrees out of phase with respect to the base injected frequency (usually third harmonic) to adjust the duty cycle between or thermal allocation between the semiconductor switches and semiconductor diodes between the phases.

Figure 8:
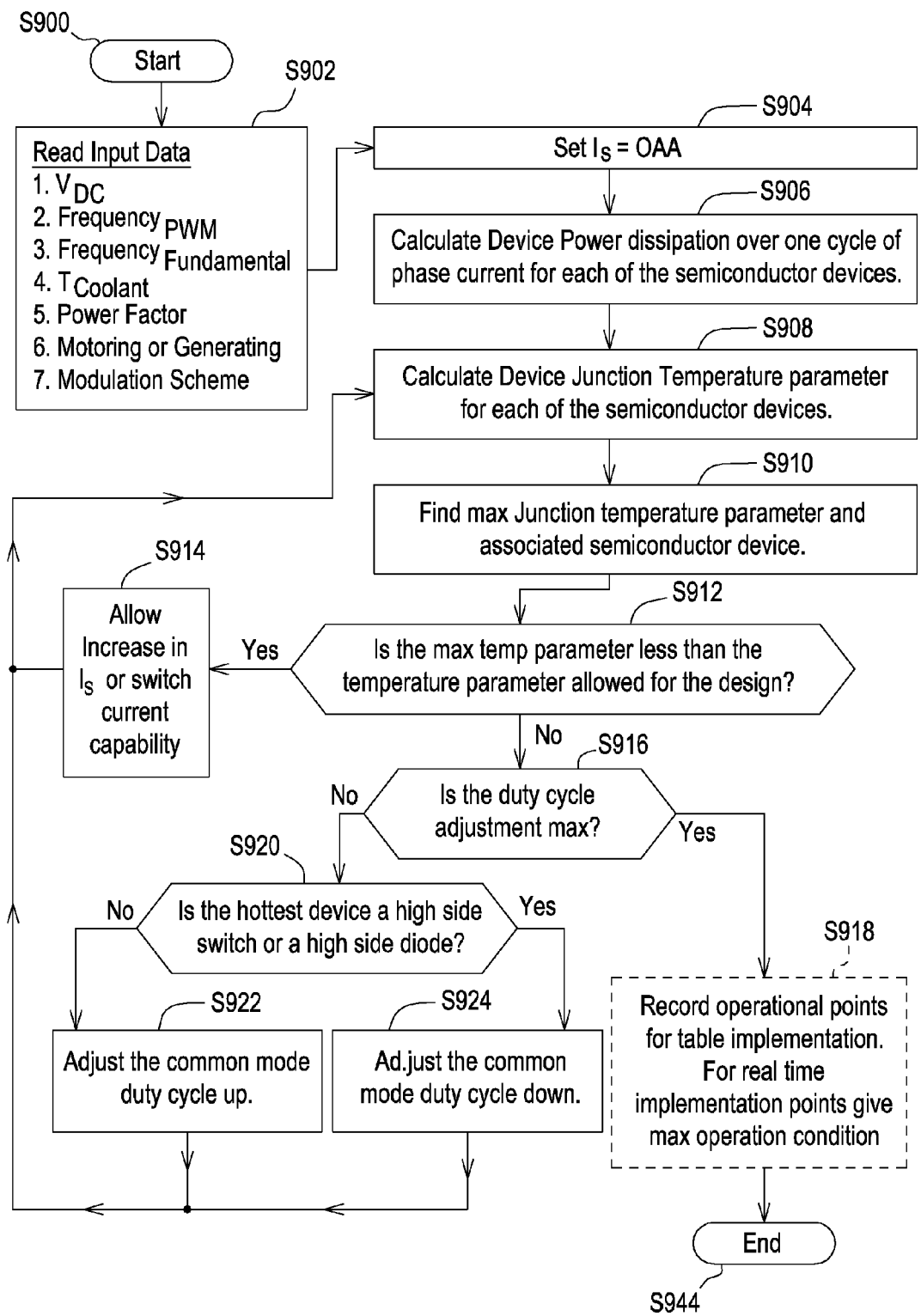
FIG. 8 is a flow chart of a sixth embodiment of a method and inverter with thermal management for controlling an electric machine.

FIG. 8 is a flow chart of a sixth embodiment of a method and inverter with thermal management for controlling an electric machine (e.g., inverter 188). The method of FIG. 8 begins in the start block of step S900.

In step S902, the data processing system 120 or data processor 264 reads or obtains one or more of the following input data: (1) voltage of direct current voltage bus ($V_{DC}$) that feeds the inverter 188 and its semiconductor devices (Q1-Q6, and D1-D6), (2) a frequency of the pulse width modulation signal outputted for one or more phase outputs 199 of the inverter 188, (3) a fundamental frequency of the output signal (e.g., substantially sinusoidal output signal) of one or more phases of the inverter 188, (4) temperature of coolant of a cooling system for cooling one or more semiconductor devices (Q1-Q6, and D1-D6) of the inverter 188, (5) power factor (e.g., typically within a range of 0.5 to 1) of the inverter, (6) whether the inverter 188 is operating in a motoring mode (motor control) or generating mode (electricity generation/rectification) and (7) modulation control scheme of the inverter such as space vector pulse width modulation (SVPWM).

In step S904, the data processing system 120 or data processor 264 sets the current of each semiconductor switch (Q1-Q6) to equal operational analysis assessment (OAA) or operational current requirement based on the operational conditions of the motor 117. For example, the operational conditions may include input data in step S902. Further, the operational conditions may include any of the following: torque command, motor load, rotor speed, inverter output voltage, inverter temperature, motor temperature, or any of the input data of step S902.

In step S906, the temperature estimation module 104 or data processing system 120 calculates device power dissipation ($P_j$, where j is number from 1 to 12 that identifies a respective semiconductor device (Q1-Q6; D1-D6) of the inverter) over one (complete) cycle of output phase current for the semiconductor devices of the inverter. Step S906 may be carried out in accordance with various techniques that may be applied cumulatively or separately. In accordance with a first technique, the temperature estimation module 104 or data processing system 120 calculates device power dissipation over one cycle of phase current for all of the semiconductor switches (Q1-Q6) of the inverter 188. In accordance with a second technique, temperature estimation module 104 or the data processing system 120 calculates device power dissipation over one cycle of phase current for all of the semiconductor diodes (D1-D6) of the inverter 188. In accordance with a third technique, the temperature estimation module 104 or the data processing system 120 calculates device power dissipation ($P_j$) over one cycle of phase current all semiconductor switches (Q1-Q6) and all diodes (D1-D6) of the inverter 188.

In step S908, the temperature estimation module 104 or data processing system 120 calculates a device junction temperature parameter for the semiconductor devices (Q1 through Q6, inclusive, and D1 through D6, inclusive) in the inverter 188. For example, the temperature estimation module 104 or the data processing system 120 estimates a temperature parameter (e.g., temperature or change in temperature) of a corresponding semiconductor device (switch Q1-Q6 or diode D1-D6) of the inverter 188 based upon thermal impedance (Θ) of the semiconductor device (e.g., thermal impedance is based on a dynamic thermal impedance model that includes the device thermal time constants and is not merely based on thermal resistance), and power dissipation (P) (e.g., conduction loss or resistance of the on-state) of the semiconductor device, where the power dissipation from step S906 may be used. The estimated temperature parameter (e.g., temperature or change in temperature) of each semiconductor device (Q1-Q6 and D1-D6) is equal to or proportional to thermal impedance multiplied by power dissipation. In other words, temperature estimation module 104 or the data processing system 120 estimates the temperature parameter, such as temperature $T_j = P_j \phi_j$, where $T_j$ is the device junction temperature for semiconductor device j, $P_j$ is the power dissipation for semiconductor device j, and $\phi_j$ is the thermal impedance for device j.

In step S910, the temperature estimation module 104 or data processing system 120 determines or identifies a semiconductor device (Q1-Q6; D1-D6) with an estimated highest junction temperature parameter (e.g., temperature or change in temperature) or an estimated maximum junction temperature parameter. For example, the temperature estimation module 104 may rank the estimated temperatures of each semiconductor device, where the temperature parameter was estimated in accordance with step S908.

In step S912, the temperature estimation module 104 or data processing system 120 determines whether the estimated maximum junction temperature parameter (e.g., temperature or change in temperature) is less than the maximum junction temperature parameter (e.g., maximum temperature or maximum change in temperature) based on a maximum change in junction temperature parameter (e.g., temperature or change in temperature) allowed for the semiconductor device (Q1-Q6; D1-D6), or for the semiconductor device in the context of the respective inverter 188 in which it is installed. For example, the maximum junction temperature (or maximum change in junction temperature) may be established based on the manufacturers specifications of the particular semiconductor device, the heat sinking design, such as passive or active cooling, and other design factors of the inverter. If the estimated maximum junction temperature parameter is less than the maximum junction temperature parameter, the method continues with step S914. However, if the estimated junction temperature parameter is equal to or greater than the maximum junction temperature parameter, the method continues with step S916.

In step S914, the data processing system 120 can increase the semiconductor current capability limit capability for the semiconductor devices, including the semiconductor device with the estimated junction temperature, if the increase is required to meet stall or near stall torque requirements (without improper thermal stress on the motor or inverter) or other torque commands for the motor, or is otherwise consistent with the input data of step S902.

In step S916, the data processing system 120 or the thermal adjustment module 104 determines whether the duty cycle adjustment is at a maximum or limit (e.g., an upper limit or a lower limit). Step S916 may be determined in accordance with various techniques that may be applied alternately and cumulatively.

Under a first technique, the maximum adjusted common mode duty cycle or its upper limit may be set equal to one-sixth (⅙) (e.g., from the center duty cycle of 0.5) and minimum adjusted duty or its lower limit may be set equal to negative one-sixth (e.g., from the center duty cycle of 0.5), if the duty cycle adjustment is based on power or current switched by the semiconductor devices (e.g., without consideration of the power dissipation, thermal impedance and junction temperature).

Under a second technique, the maximum adjusted duty or its upper limit is the peak adjusted cycle data 131 represents a peak duty cycle (i.e., PeakDutyCycle) that is based on any of the following inverter factors: (1) thermal impedance of one or more semiconductor devices (Q1-Q6; D1-D6), (2) estimated temperatures of one or more semiconductor devices (Q1-Q6; D1-D6), (3) power dissipation of one or more semiconductor devices, (4) fundamental frequency of the inverter output 199, and (5) characterization or tests to determine the above inverter factors.

If the duty cycle adjustment is not at a maximum or limit, the method continues with step S920. However, if the duty cycle is at maximum or limit, the method can continue with step S918 or wait an interval and return to S902.

In step S918, the data processing system 120 may record operational data (e.g., operational points) for storage as one or more files, tables, a database, or other data records as peak adjusted cycle data 131 in a data storage device 260. Accordingly, during operation of the inverter 188, the data processing system 120 may retrieve or read (in real time) the previously stored data records or peak adjusted cycle data 131 (from prior iterations of the method of FIG. 9) to control operation of the inverter in steps S922, S924, or both. Step S918 is shown in dashed lines because it is optional and may be replaced by factory programming or field programming of the data records or peak adjusted cycle data 131, in which case step S918 would wait a time interval prior to returning to step S902, for example.

In step S920, the data processing system 120, the thermal adjustment module 130, or the temperature estimation module 104 determines whether the hottest semiconductor device (Q1 through Q6, inclusive; D1 through D6, inclusive) of the inverter 188 is a high-side switch (Q1, Q3, Q5) or high side diode (D1, D3, D5). If the data processing system 120 or the module (104, 130) determines that that hottest semiconductor device is a high-side switch or a high-side diode, then the method continues with step S924. However, if the data processing system 120 or the module (104, 130) determines that the hottest semiconductor device is not a high-side switch or is not a high-side diode, the method continues with step S922.

In step S922, the data processing system 120 or the thermal adjustment module 130 adjusts upward or increases the common mode duty cycle. In one example, the data processing system 120 or the thermal adjustment module 130 may increase the common mode duty cycle to allow the hottest semiconductor device (e.g., low-side switch Q2, Q4, Q6; or low-side diode D2, D4, D6) to cool by allowing one or more other semiconductor devices (e.g., Q1, Q3, Q5, D1, D3, D5) to conduct current longer during each cycle. In another example, in step S922 the thermal adjustment module 130 or the data processing system 120 adjusts the duty cycle (e.g., common mode duty cycle) upwards or provides an adjusted common mode duty ratio, called "Adjusted Duty," in accordance with the following equation:

$$|AdjustedDuty| = 3 \times \frac{|I_{max}| - |I_{medium}|}{|I_{max}| + |I_{medium}|} \times PeakAdjustedDuty$$

where "PeakAdjustedDuty" is the desired peak adjusted duty cycle data 131 (e.g., multiplier) that is retrieved or read from a look-up table or other data record in a data storage device 260 of the data processing system 120, $I_{max}$ is the maximum phase current (e.g., collector current or forward biased diode current) of the semiconductor devices (e.g., device with greatest current) of currents in phases A (355), B (357), C (359) of FIG. 1B, and $I_{medium}$ is the medium phase current of the semiconductor devices that is less than the maximum current but greater than the minimum phase current. These values of maximum phase current, medium phase current, or other phase currents are instantaneous and the maximum and medium values can change continuously. FIG. 9 shows illustrative examples of the waveforms described in this document. For, example, $I_{max}$ may be the highest current or maximum current of the three phases; $I_{medium}$ may be the medium current of the three phases that is between the phase with the lowest current and the highest current. In one embodiment, the maximum current and the medium current may be estimated by the output phase current at output terminals 199, by sensing circuit 124 or by one or more current sensors coupled to one or more switched terminals of any particular high-side semiconductor device or low-side semiconductor device.

In an alternate embodiment, step S922 is modified or replaced such that the data processing system 120 or the thermal adjustment module 130 can maintain the existing duty cycle or adjust the duty cycle to sacrifice the longevity of one semiconductor device versus one or more other semiconductor devices in the inverter 188.

In step S924, the data processing system 120 or the thermal adjustment module 130 adjusts downward or decreases the common mode duty cycle for the hottest semiconductor device (e.g., switches Q1, Q3, Q5 or diodes D1, D3, D5). In one example, the data processing system 120 or the thermal adjustment module 130 may increase the common mode duty cycle to allow the hottest semiconductor device (e.g., switches Q1, Q3, Q5 or diodes D1, D3, D5) to cool by allowing one or more other semiconductor devices (e.g., Q2, Q4, Q6, D2, D4, D6) to conduct current longer during each cycle. In another example, in step S924 the thermal adjustment module 130, or the data processing system 120 adjusts the duty cycle (e.g., common mode duty cycle) downwards or provides an adjusted common mode duty ratio, called "Adjusted Duty," in accordance with the following equation:

$$|AdjustedDuty| = 3 \times \frac{|I_{max}| - |I_{medium}|}{|I_{max}| + |I_{medium}|} \times PeakAdjustedDuty$$

where "PeakAdjustedDuty" is the desired peak adjusted duty cycle data 131 (e.g., multiplier) that is retrieved or read from a look-up table or other data record in a data storage device 260 of the data processing system 120, $I_{max}$ is the maximum phase current (e.g., collector current or forward biased diode current) of the semiconductor devices (e.g., device with greatest current) of currents in phases A (355), B (357), C (359) of FIG. 1B, and $I_{medium}$ is the medium phase current of the semiconductor devices that is less than the maximum current but greater than the minimum phase current. These values of maximum phase current, medium phase current, or other phase currents are instantaneous and the maximum and medium values can change continuously. FIG. 9 shows illustrative examples of the waveforms described in this document. For, example, $I_{max}$ may be the highest current or maximum current of the three phases; $I_{medium}$ may be the medium current of the three phases that is between the phase with the lowest current and the highest current. In one embodiment, the maximum current and the medium current may be estimated by the output phase current at output terminals 199, by sensing circuit 124 or by one or more current sensors coupled to one or more switched terminals of any particular high-side semiconductor device or low-side semiconductor device.

In an alternate embodiment, step S924 is modified or replaced such that the data processing system 120 or the thermal adjustment module 130 can maintain the existing duty cycle or adjust the duty cycle to sacrifice the longevity of one semiconductor device versus one or more other semiconductor devices in the inverter 188.

After steps S914, S922, or S924 the method may return to step S908, for example, or another earlier step.

In FIG. 19, the vertical axis indicates current (e.g., in units of amperage) of the signal, except for the adjusted duty cycle which is multiplied by 1000 to put it on the axis with the currents, whereas the horizontal axis indicates degrees of phase angle or phase (e.g., in units of degrees) of the signal. FIG. 9 illustrates a chart of current output waveforms (502, 504, 506) (e.g., substantially sinusoidal waveforms) for each phase terminal (355, 357, 359, respectively) and a corresponding common mode offset function waveform 508 (e.g., substantially triangular waveform) as an input signal (or the basis for a derivative signal inputted) associated with the driver 177. The signal 508 is derived from:

$$|AdjustedDuty_{Base}| = \frac{1}{2} \times \frac{|I_{max}| - |I_{medium}|}{|I_{max}| + |I_{medium}|}$$

In one embodiment, the thermal adjustment module 130 or the data processing system 120 adjusts, controls or processes the common mode offset function waveform 508 to make the maximum average diode power loss equal to the medium average diode current in the inverter 188, or to make the maximum average switch current (e.g., 510) equal to the medium average switch current (e.g., 512) in the inverter 188.

As illustrated in FIG. 9, the three output phase current waveforms (502, 504, 506) at the output terminals 199 of the inverter are substantially sinusoidal. The first phase output current waveform 502 (Phase A) is offset in phase angle with respect to the second phase output current waveform 504 (Phase B) and the third phase output current waveform 506 (Phase C). The common mode offset function waveform 508 comprises a substantially triangular waveform. In one embodiment, the common mode offset function waveform 508, or a derivative thereof, is injected into the driver 177 or input terminals (370, 371) of one or more switches (Q1 through Q6, inclusive) of the inverter 188 to adjust a common mode duty ratio of the inverter in accordance with a peak adjusted duty, where the peak adjusted duty is based on the maximum current waveform 510 and the medium current waveform 512 (e.g., at duty ratio of 0.5) for a semiconductor device for each cycle, and peak adjusted duty data 131. For example, the common mode duty ratio can be adjusted or the adjusted duty ratio is determined in accordance with the following equation, at least for the first sector of SVPWM:

$$|AdjustedDuty| = 3 \times \frac{|I_{max}| - |I_{medium}|}{|I_{max}| + |I_{medium}|} \times PeakAdjustedDuty$$

where "PeakAdjustedDuty" is the desired peak adjusted duty data 131 that is retrieved or read from a look-up table or other data record in a data storage device 260 of the data processing system 120, $I_{max}$ is the maximum current (e.g., 510, which can represent the collector current or forward biased diode current) of a semiconductor device (e.g., Q1 through Q6, inclusive, or D1 through D6, inclusive; the semiconductor device with a greatest current or the hottest semiconductor) over a cycle, and $I_{medium}$ (e.g., 512) is the medium current (e.g., at approximately 0.5 duty cycle) of the same semiconductor device or another semiconductor device of a different phase that is less than the maximum current over the same cycle or different cycle. For example, $I_{max}$ may be the highest current or maximum current of the three phases at terminals 199; $I_{medium}$ may be the medium current of the three phases, at terminals 199, that is between the phase with the lowest current and the highest current. In one embodiment, the peak or maximum current 510 is a substantially half-wave form of positive sinusoidal excursions during a cycle that is associated with a corresponding substantially sinusoidal waveform output during the cycle by one or more phases of the inverter. In one embodiment, the medium current 512 is a substantially triangular waveform or generally arched waveform during a cycle based associated with a corresponding substantially sinusoidal waveform output during the cycle by one or more phases of the inverter.

Figure 10A:
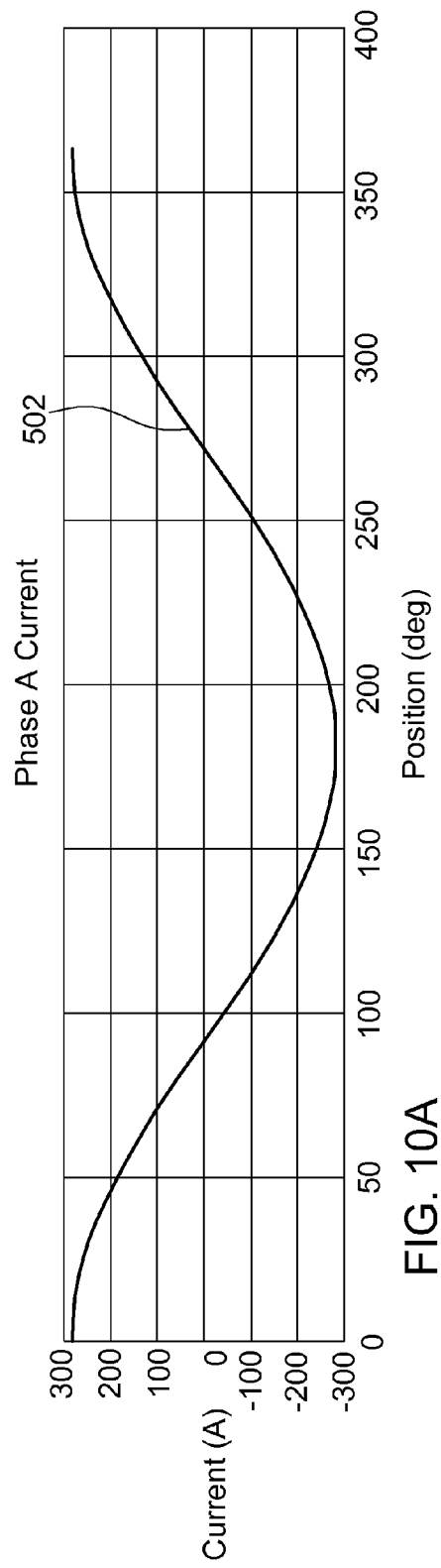
FIG. 10A shows a first phase current (e.g., Phase A) amplitude versus phase angle (in degrees) at an output terminal of the inverter.

FIG. 10A shows a first phase current 502 (e.g., Phase A current) amplitude versus phase angle (in degrees) at an output terminal of the inverter. The vertical axis reflects the amplitude of the current, whereas the horizontal axis shows the phase or position in degrees.

Figure 10B:
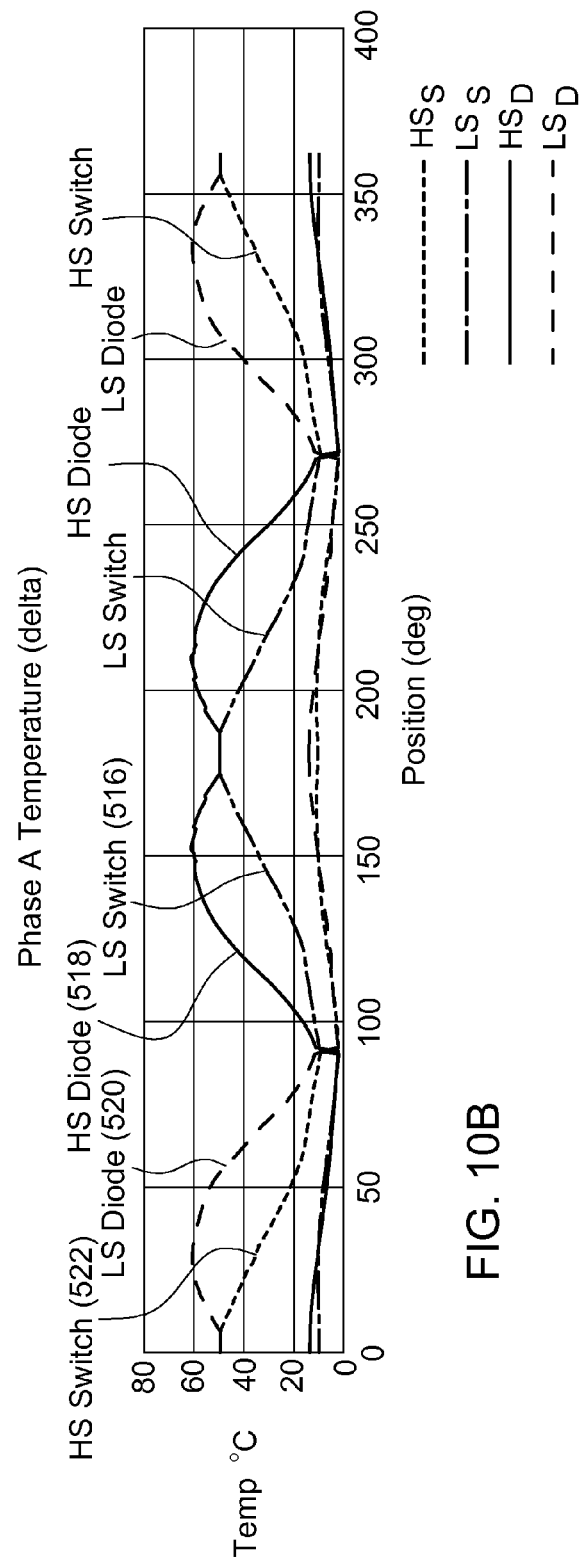
FIG. 10B shows a first phase temperature versus phase angle (in degrees) at an output terminal of the inverter, where the phase angle of the temperature of FIG. 10B is aligned with the phase angle of the current in FIG. 10A.

FIG. 10B shows first phase temperatures of various semiconductor devices versus phase angle or position (in degrees) at an output terminal 199 of the inverter 188, where the phase angle or position of the temperature of FIG. 10B is aligned with the phase angle of the current in FIG. 10A. The high-side switch temperature 522 is illustrated by dashed line of short dashes; the low-side switch temperature 516 is illustrated by an alternating long and short dashed line. The high-side diode temperature 518 is illustrated by a solid line; the low-side diode temperature 520 is illustrated by a dashed line of long dashes.

Figure 10C:
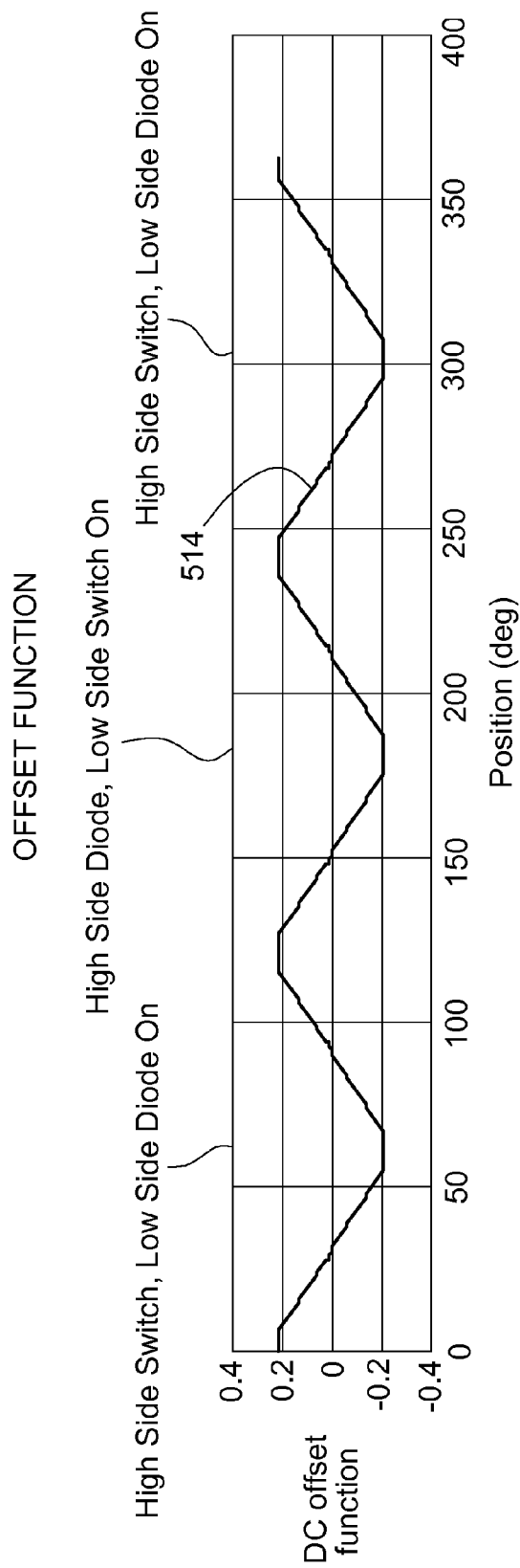
FIG. 10C shows a first phase offset function as an input to the first phase terminal to allocate thermal dissipation between the switches or diodes of one or more phases in accordance with a temperature management plan, where the phase angle of the common mode offset function is aligned with the phase angle of the current in FIG. 10A.

FIG. 10C shows common mode offset function waveform 514 that can be adjusted with a common mode offset or otherwise to allocate thermal dissipation between the switches (Q1-Q6) or diodes (D1-D6) of one or more phases in accordance with a temperature management plan, where the phase angle or position of the common mode offset function waveform 514 is aligned with the phase angle or position of the current waveform 502 in FIG. 10A and temperature curves (516, 518, 520, 522) in FIG. 10B. The adjusted common mode voltage waveform or the common mode offset function 514 may be varied based on the fundamental frequency below the threshold frequency. If the fundamental frequency or carrier frequency of the inverter is above the threshold frequency, SVPWM modulation may be used with no direct current offset and no adjusted common mode voltage waveform.

Figure 11A:
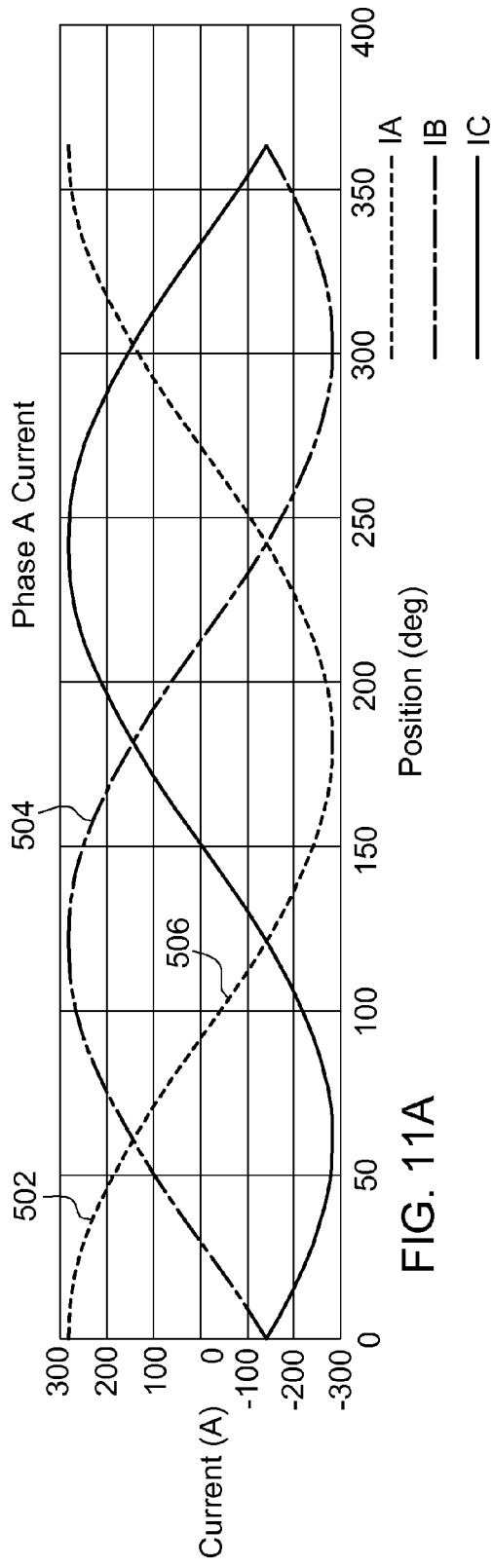
FIG. 11A shows phase current amplitude versus time at an output terminals of the inverter at a low fundamental frequency above stall speed of the electric machine.

FIG. 11A shows steady state phase current amplitude waveforms (502, 504, 506) versus phase or position (in degrees) at output terminals 199 of the inverter 188 at a low fundamental frequency that is above a stall fundamental frequency or not associated with a stall state of the electric machine (e.g., motor 117). For example, the low fundamental frequency of phase current waveforms (502, 504, 506) in FIG. 11A is greater than the stall fundamental frequency and less than or equal to the fundamental threshold frequency. Phase A waveform 502 at Phase A output terminal 355 is indicated by the solid curved line and may be substantially sinusoidal. The Phase B waveform 504 at output terminal 357 is indicated by a dashed curved line and may be substantially sinusoidal. The Phase C waveform at output terminal 359 is indicated by a dotted curved line and may be substantially sinusoidal.

Figure 11B:
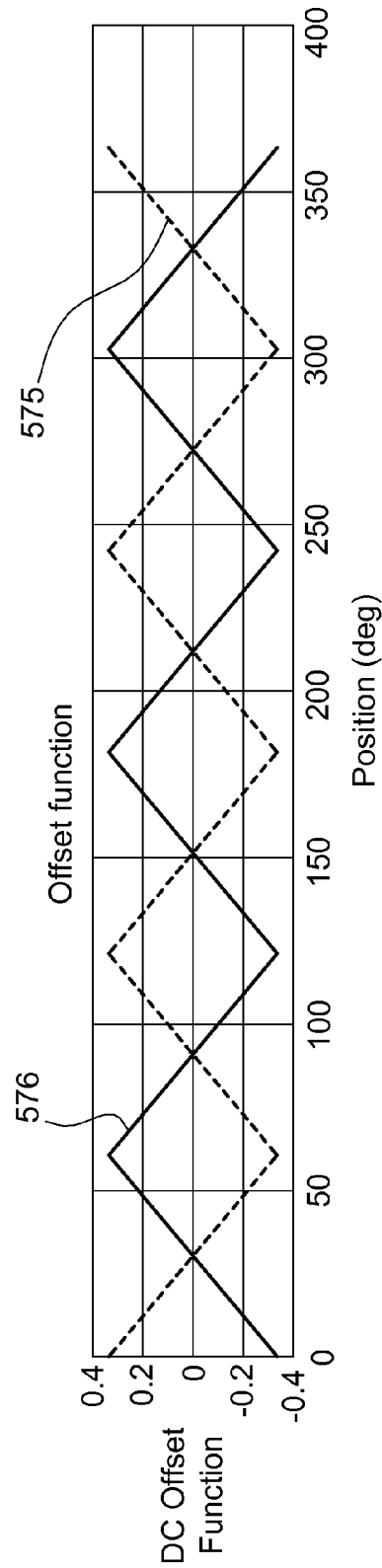
FIG. 11B shows the adjusted duty ratio function or the direct current (DC) offset function at the low fundamental frequency above stall speed of the electric machine.

FIG. 11B shows the adjusted duty ratio function (common mode) or the primary direct current (DC) offset function waveform 575 at the low fundamental frequency above stall state of the electric machine that corresponds to the phase current amplitude versus phase angle or position (in degrees) of FIG. 11A. FIG. 11B shows the adjusted duty ratio function (common mode) or the secondary direct current (DC) offset function waveform 576 at the low fundamental frequency above stall state of the electric machine that corresponds to the phase current amplitude versus phase angle or position (in degrees) of FIG. 11A. The primary common mode offset function waveform 575 is approximately one-hundred and eighty (180) degrees out of phase with respect to the secondary common mode offset function waveform 576, where both waveforms (575, 576) have approximately the same frequency as illustrated. The phase angle or phase shift (e.g., approximately zero degrees with respect to the fundamental waveform) of the primary common mode offset function waveform 575 allocates (e.g., symmetrically) the heat dissipation toward the diodes (D1 through D6, inclusive) of all three phases, whereas the opposite phase angle or phase shift (e.g., approximately 180 degrees between waveforms 575 and 576) of the secondary common mode offset function waveform 576 allocates (e.g., symmetrically) the heat dissipation toward the switches (Q1 through Q6, inclusive).

The low fundamental frequency of phase current of the waveforms (575, 576) in FIG. 11A is greater than the stall fundamental frequency and less than or equal to the fundamental threshold frequency. For example, at low fundamental frequencies near or below the fundamental threshold and above the stall frequency or stall state of the electric machine, the duty cycle or common mode offset function waveform (575, 576) may deviate near its maximum value of +/−0.5 from its central value of 0.5, as indicated in FIG. 11B. As illustrated, the common mode offset function waveform (575, 576) has a substantially sine function-triangular waveform or cosine function-triangular waveform, or a derivative thereof, although trapezoidal and other waveforms may be used in alternate embodiments.

Figure 12A:
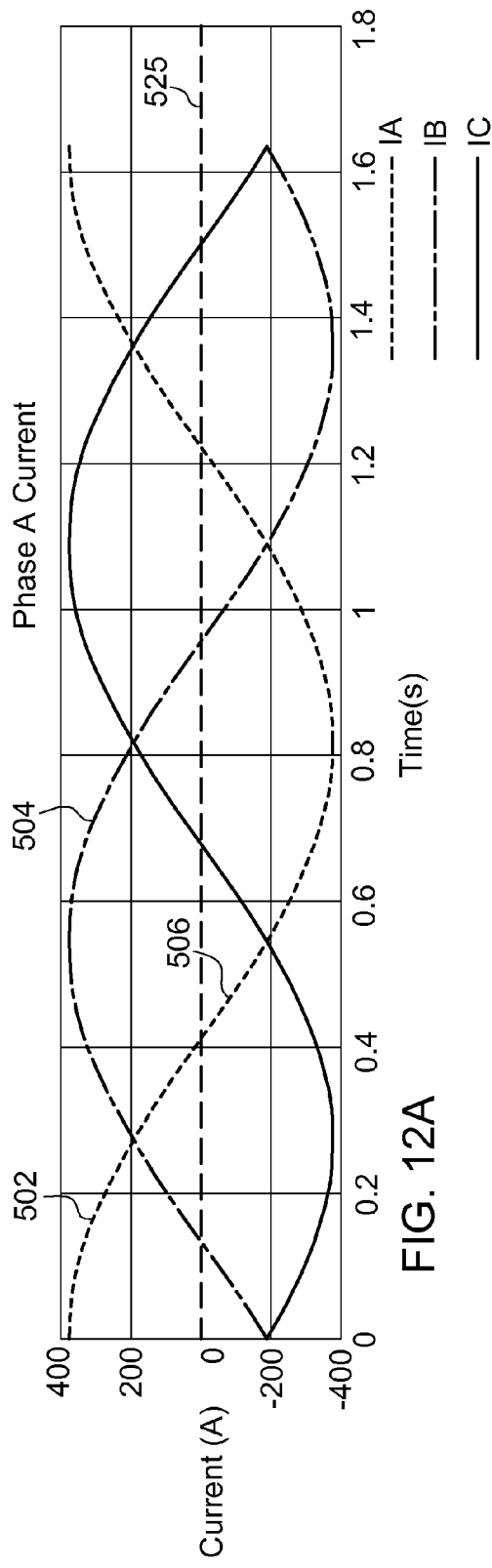
FIG. 12A shows phase current amplitude versus time at an output terminals of the inverter at a low speed at or near stall speed of the electric machine.
Figure 12B:
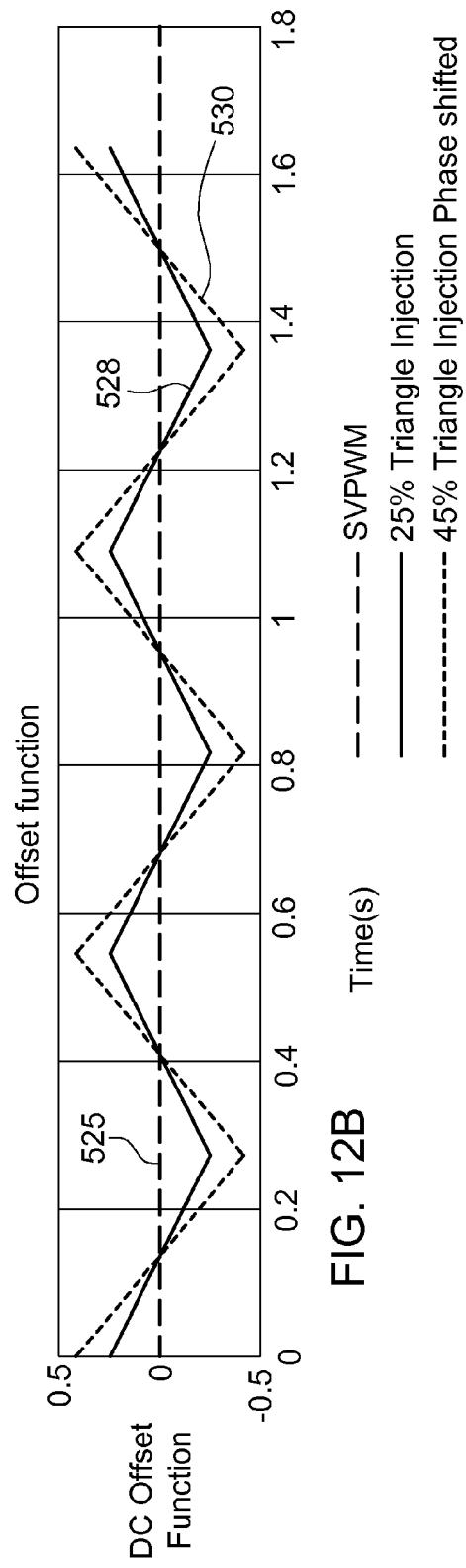
FIG. 12B shows the adjusted duty ratio function or the direct current (DC) offset function at a low speed at or near stall speed of the electric machine.

FIG. 12A shows phase current amplitude waveforms (502, 504, 506) versus time at an output terminals 199 of the inverter 188 at a low fundamental frequency at or near a stall frequency (e.g., approximately 0.5 Hz to 2 Hz) of the electric machine. The low fundamental frequency of phase current waveforms (502, 504, 506) in FIG. 12A is at or around the stall fundamental frequency and less than or equal to the fundamental threshold frequency. The Phase A waveform 502 at Phase A output terminal 355 is indicated by a solid curved line and may be substantially sinusoidal. The Phase B waveform 504 at output terminal 357 is indicated by the dashed curved line and may be substantially sinusoidal. Phase C waveform 506 at output terminal 359 is indicated by the dotted curved line and may be substantially sinusoidal.

In FIG. 12A, the phase current amplitude waveforms (502, 504, 506) are symmetrical about a central axis 525. In one embodiment, if the common mode offset function 528 or 530 of FIG. 12B can be shifted in phase with respect to one or more output phases at terminal 199, or in peak amplitude, or both to adjust the heat dissipation between the semiconductor devices, or the balance between the semiconductor switches and the diodes.

FIG. 12B shows two illustrative adjusted duty ratio functions or the common mode offset function waveforms (528, 530) at a low fundamental frequency associated with at or near stall speed conditions of the electric machine (e.g., 117) that corresponds to the phase current amplitude versus time of FIG. 12A. The low fundamental frequency of phase current in FIG. 12B is at or around the stall fundamental frequency and less than or equal to the fundamental threshold frequency. At lower fundamental frequencies than the threshold that are at or near stall fundamental frequency (e.g., from approximately 2 Hz to approximately 0.5 Hz), the duty cycle or common mode offset function waveform 530 may deviate approximately 0.4 to approximately 0.48 from its central value about the central axis 525, as indicated by the dashed line curve in FIG. 12B. At or near the stall state, the adjusted common mode voltage waveform or common mode offset function 530 of FIG. 12B can have a peak magnitude that approaches approximately 0.48 or 0.5 on the vertical axis about a central axis 525 (e.g., at 0 on the vertical axis) that represents approximately 0.5 duty cycle or fifty percent (50) common mode injection. As illustrated, the common mode offset function waveform 530 has a substantially sine function-triangular waveform or cosine function-triangular waveform, or a derivative thereof, although trapezoidal and other waveforms may be used.

FIG. 12B illustrates two variations of the adjusted common mode voltage waveform or common mode offset function, where the first common mode offset function waveform 530, indicated by the dashed line curve, has approximately 40 to 48 percent triangular injection waveform about a central axis (e.g., at 0 on the vertical axis) that represents approximately 0.5 duty cycle or fifty percent (50) common mode injection. The second common mode offset function waveform 528, indicated by the solid line curve, has approximately 25 percent triangular injection waveform. The first common mode offset function waveform 530 has higher amplitude peaks and greater slopes of magnitude versus time (shorter rise and fall times) than the second common mode offset function waveform 528. Further, the first common mode offset function waveform 530 may be phase-shifted. For example, if the common mode offset function (e.g., the first common mode offset waveform 530 or the second common mode offset function waveform 528) is phase-shifted by approximately 180 degrees, the heat dissipation can be reallocated from or to the semiconductor switches versus the semiconductor diodes, or vice versa.

FIG. 12B illustrates the adjusted common mode voltage waveform or common mode offset function waveform (528, 530) about a central axis 525. The amplitude or peak of the common mode offset waveform (528, 530), the phase of the common mode offset function waveform with respect to the output phase of the inverter at terminals 199, or both can allocate, asymmetrically or symmetrically, heat dissipation between the semiconductor devices (Q1-Q6; D1-D6) in the inverter 188 in accordance with a heat allocation management plan, such as based on the previously described equation for the adjusted common mode duty cycle or ratio.

In one embodiment, the adjusted common mode voltage waveform or common mode offset function waveform (528, 530) can have a symmetrical impact with respect to the duty cycle and heat allocation within the semiconductor devices of each phase in the inverter 188 by using a harmonic (e.g., third harmonic or integer multiple of the third harmonic) of the common mode offset function waveform that is equal to the number of phases (e.g., three) multiplied by the inverter fundamental frequency. The thermal adjustment module 130 or data processor adjusts duty cycle to shift the losses and therefore move heat dissipation between different semiconductor devices (e.g., Q1-Q6, inclusive and D1-D6, inclusive) in different phases symmetrically by shifting the common mode duty cycle in a symmetric third harmonic manner where the voltage or current is reduced in the first semiconductor switch (e.g., in one phase, such as Phase A) with respect to the second conducting semiconductor device (e.g., of another phase, such as Phase B or Phase C) and third conducting semiconductor device (e.g., of another phase, such as Phase B or Phase C).

Figure 13A:
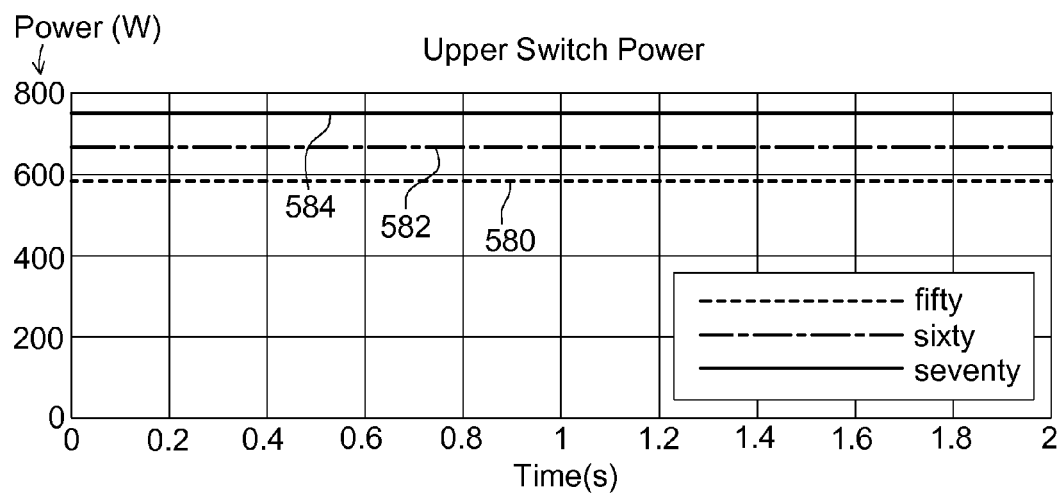
FIG. 13A shows a graph of the power versus time for a high-side switch in an illustrative phase of the inverter with various corresponding common mode duty cycle percentages.
Figure 13B:
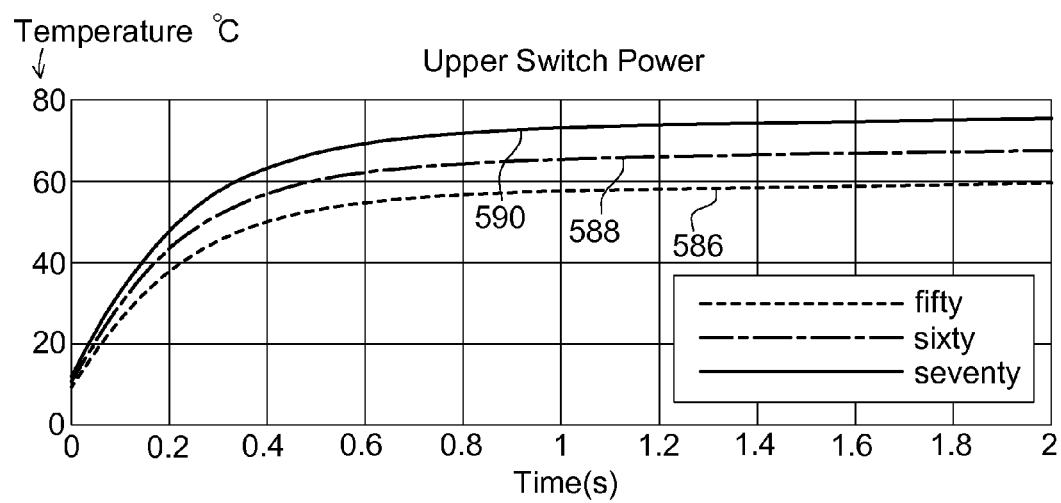
FIG. 13B shows a graph of temperature versus time for the high-side switch of FIG. 13A at various corresponding common mode duty cycle percentages.

FIG. 13A shows a graph of the power (in watts) versus time for a high-side switch (Q1, Q3, Q5) in an illustrative phase of the inverter 188 with various corresponding common mode duty cycle percentages operating at stall. The dotted line shows the power level 584 in or dissipated by the high-side switch at a seventy percent duty cycle. The dashed line shows the power level 582 in or dissipated by the high-side switch at a sixty percent duty cycle. The solid line shows the power level 580 in or dissipated by the high-side switch at a fifty percent duty cycle.

FIG. 13B shows a graph of temperature versus time for the high-side switch (Q1, Q3, Q5) of FIG. 13A at various corresponding common mode duty cycle percentages. The dotted line shows the temperature curve 590 of the high-side switch at a seventy percent duty cycle. The dashed line shows the temperature curve 588 of the high-side switch at a sixty percent duty cycle. The solid line shows the power level 586 of the high-side switch at a fifty percent duty cycle. In general, FIGS. 13A and 13B illustrate that each high-side switch handles more power and must dissipate more heat with an increase in the common mode duty cycle or duty ratio. Conversely, each high-side switch handles less power and must dissipate less heat with a decrease in the common mode duty cycle or duty ratio.

Figure 14A:
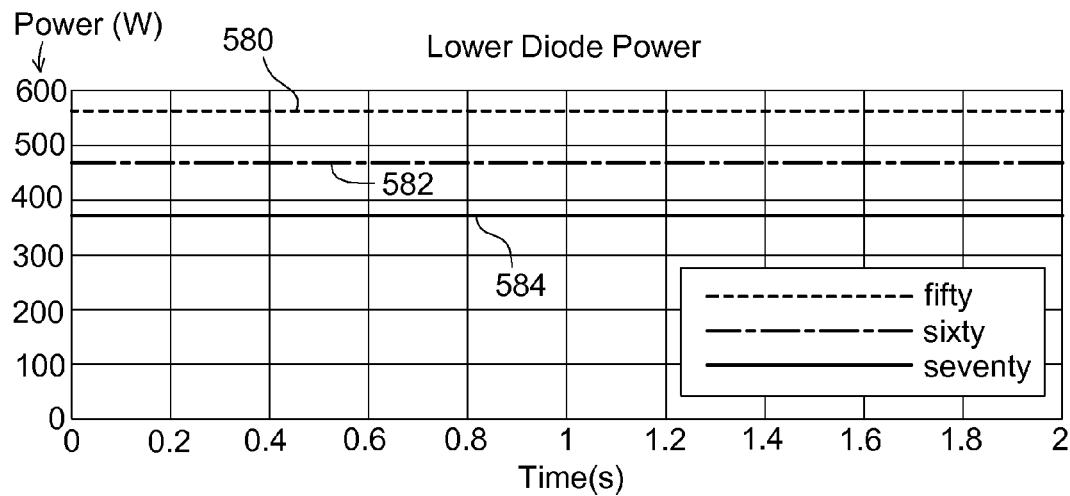
FIG. 14A shows a graph of the power versus time for a low-side diode in the illustrative phase of the inverter (e.g., same phase as in FIG. 11A) with various corresponding common mode duty cycle percentages.

FIG. 14A shows a graph of the power (in watts) versus time for a low-side diode (D2, D4, D6) in an illustrative phase of the inverter 188 with various corresponding common mode duty cycle percentages. The dotted line shows the power level 584 in or dissipated by the low-side diode at a seventy percent duty cycle. The dashed line shows the power level 582 in or dissipated by the low-side diode at a sixty percent duty cycle. The solid line shows the power level 580 in or dissipated by the low-side diode at a fifty percent duty cycle.

Figure 14B:
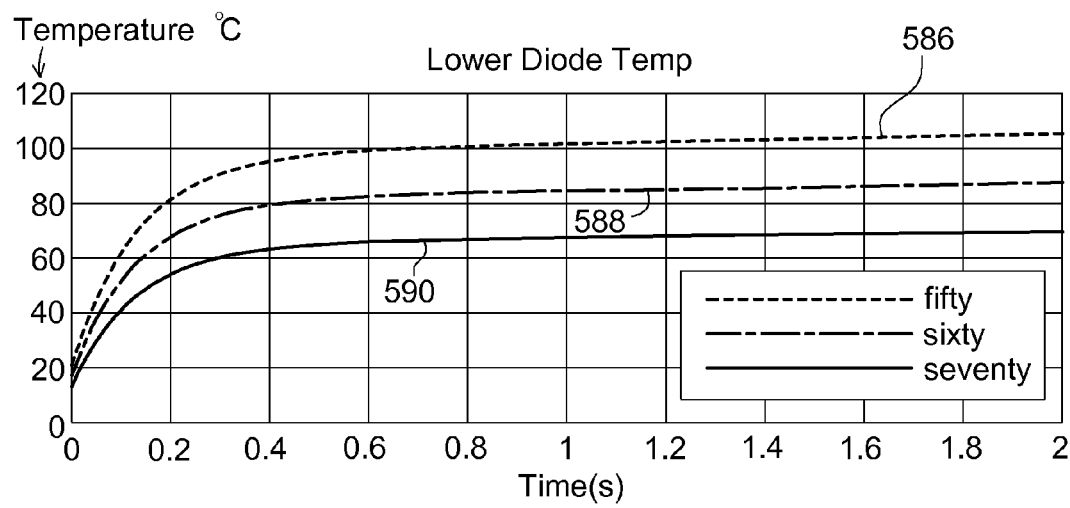
FIG. 14B shows a graph of temperature versus time for the low-side diode of FIG. 12A at various corresponding common mode duty cycle percentages.

FIG. 14B shows a graph of temperature versus time for the low-side diode (D2, D4, D6) of FIG. 14A at various corresponding common mode duty cycle percentages. The dotted line shows the temperature curve 590 of the low-side diode at a seventy percent duty cycle. The dashed line shows the temperature curve 588 of the low-side diode at a sixty percent duty cycle. The solid line shows the power level 586 of the low-side diode switch at a fifty percent duty cycle. In general, FIGS. 14A and 14B illustrate that each low-side diode handles less power and must dissipate less heat with an increase in the common mode duty cycle or duty ratio. Conversely, each low-side diode handles more power and must dissipated more heat with a decrease in the common mode duty cycle or duty ratio. Accordingly, heat can be allocated between the high-side switch and the low-side diode by increasing or decreasing the common mode duty cycle or duty ratio in accordance with FIG. 13A through 14B, inclusive.

Having described the preferred embodiment, it will become apparent that various modifications can be made without departing from the scope of the invention as defined in the accompanying claims.

The following is claimed:

1. A method for operating an inverter to control an electric machine, the method comprising:
   determining a fundamental frequency of one or more inverter phases based on a torque command to control the torque, speed or direction of the electric machine;
   establishing an initial reference output current based on the torque command;
   estimating each junction temperature of a corresponding semiconductor device, among a plurality of semiconductor devices, for each phase of an inverter;
   determining a hottest device with a highest junction temperature among the semiconductor devices in the inverter; and
   determining if the highest junction temperature parameter is less than maximum junction temperature parameter for the respective semiconductor device for deciding whether or not to adjust a duty cycle of the semiconductor devices.

2. The method according to claim 1 further comprising:
   adjusting the duty cycle if the fundamental frequency is less than the threshold frequency and if the highest junction temperature is greater than or equal to the maximum junction temperature parameter.

3. The method according to claim 1 further comprising:
   determining whether the duty cycle adjustment is at a maximum; and
   adjusting the duty cycle if the duty cycle adjustment is not at the maximum, to limit the junction temperature of the hottest device at an output current level, and if the estimated junction temperature parameter is greater than or equal to the maximum junction temperature parameter.

4. The method according to claim 1 further comprising:
   authorize availability of an increase in the initial reference output current if the junction temperature is less than the maximum junction temperature, the availability of the increase dependent upon the torque command.

5. The method according to claim 1 further comprising:
   determining whether the duty cycle adjustment is at a maximum or limit; and
   adjusting the duty cycle upward if the duty cycle adjustment is not at the maximum or limit to limit the junction temperature if the hottest device among the semiconductor devices is a not a high-side switch or not a high-side diode.

6. The method according to claim 5 wherein the duty cycle is determined based on a maximum current in one of the semiconductor devices or an output phase with a highest current, a medium current in a semiconductor device or an output phase with a lower current than the maximum current but not the minimum current device or phase, and a peak adjusted duty cycle, wherein the peak adjusted duty cycle stored in a data storage device and can be determined by a characterization of the inverter.

7. The method according to claim 5 wherein the duty cycle is adjusted in accordance with the following equation:

$$|AdjustedDuty| = 3 \times \frac{|I_{max}| - |I_{medium}|}{|I_{max}| + |I_{medium}|} \times PeakAdjustedDuty$$

where "PeakAdjustedDuty" is the desired peak adjusted duty cycle data, $I_{max}$ is the maximum current of a semiconductor device with a greatest current, and $I_{medium}$ is the medium current of another semiconductor device of a different phase that is less than the maximum current.

8. The method according to claim 1 further comprising:
determining whether the duty cycle adjustment is at a maximum; and
adjusting the duty cycle downward if the duty cycle adjustment is not at the maximum to limit the junction temperature if the hottest device among the semiconductor devices is a high-side switch or a high-side diode.

9. The method according to claim 8 wherein the duty cycle is determined based on a maximum current, a medium current, and a peak adjusted duty parameter, wherein the peak adjusted parameter stored in data storage device and can be determined by a characterization of the inverter.

10. The method according to claim 8 wherein the duty cycle is adjusted in accordance with the following equation:

$$|AdjustedDuty| = 3 \times \frac{|I_{max}| - |I_{medium}|}{|I_{max}| + |I_{medium}|} \times PeakAdjustedDuty$$

where "PeakAdjustedDuty" is the desired peak adjusted duty cycle data, $I_{max}$ is the maximum current of a semiconductor device with a greatest current, and $I_{medium}$ is the medium current of another semiconductor device of a different phase that is less than the maximum current.

11. A method for operating an inverter to control an electric machine, the method comprising:
determining a fundamental frequency of one or more inverter phases based on a torque command to control the torque, speed or direction of the electric machine;
estimating each junction temperature of a corresponding semiconductor device, among a plurality of semiconductor devices, for each phase of an inverter based on a characterization of a dynamic thermal impedance and power dissipation for each one of the semiconductor devices;
determining a hottest device with a highest junction temperature among the semiconductor devices; and
establishing a thermal allocation among semiconductor devices, the semiconductor devices comprising a low-side semiconductor switch, a high-side semiconductor switch, a low-side diode and a high-side diode, to limit a junction temperature of the hottest device among the semiconductor devices to a maximum temperature by shifting heat dissipation to one or more semiconductor devices with available or spare heat dissipation based upon its or their estimated junction temperature parameter being less than a respective maximum junction temperature parameter for the one or more semiconductor devices; and adjusting a duty cycle between the semiconductor devices in each phase and different phases in accordance with the thermal allocation by injection of a offset function waveform to a pulse-width modulation generation module to produce a suitable driving signal for input terminals of a high-side semiconductor switch and low-side semiconductor switch of each phase to realize a generally sinusoidal output waveform for each phase of the inverter if the determined fundamental frequency is less than or equal to a threshold frequency.

12. The method according to claim 11 wherein the adjusted duty cycle has a corresponding maximum output current for each phase, and wherein peak adjusted duty is determined based on maximum duty cycle adjustment when the inverter is operating at the maximum output current.

13. The method according to claim 11 wherein the adjusted duty cycle is expressed as the following equation:

$$|AdjustedDuty| = 3 \times \frac{|I_{max}| - |I_{medium}|}{|I_{max}| + |I_{medium}|} \times PeakAdjustedDuty$$

where "PeakAdjustedDuty" is the desired peak adjusted duty cycle data, $I_{max}$ is the maximum current of a semiconductor device with a greatest current over, and $I_{medium}$ is the medium current of another semiconductor device of a different phase that is less than the maximum current.

14. The method according to claim 11 wherein the common mode duty cycle is adjusted dynamically between zero (0) and point five (0.5).

15. The method according to claim 11 wherein the duty cycle is adjusted to shift losses and therefore move heat dissipation within a phase of the inverter between a low-side semiconductor device and a high-side semiconductor device.

16. The method according to claim 11 wherein the duty cycle is adjusted to shift losses and therefore move heat dissipation within a phase of the inverter between a semiconductor switch and an opposite diode associated with an opposite semiconductor switch in the same phase.

17. The method according to claim 11 wherein the duty cycle is adjusted to shift losses and therefore move heat dissipation within a phase of the inverter from a semiconductor switch to an opposite diode associated with an opposite semiconductor switch in the same phase.

18. The method according to claim 11 wherein the duty cycle is adjusted to shift losses and therefore move heat dissipation within a phase of the inverter from a diode to an opposite semiconductor switch associated with an opposite diode in the same phase.

19. The method according to claim 11 wherein the duty cycle is adjusted to shift the losses and therefore move heat dissipation between different semiconductor devices in different phases symmetrically by shifting the common mode duty cycle in a symmetric third harmonic manner where the voltage or current is reduced in the first semiconductor switch with respect to the second and third conducting semiconductor device.

20. The method according to claim 11 wherein the duty cycle is adjusted to shift the heat dissipation between switches and diodes of the inverter by changing the polarity or phase offset of the injected common mode offset function waveform from approximately zero degrees to approximately 360 degrees.

* * * * *